United States Patent
Li et al.

(10) Patent No.: US 11,451,619 B2
(45) Date of Patent: Sep. 20, 2022

(54) APP REMOTE CONTROL METHOD AND RELATED DEVICES

(71) Applicant: HONOR DEVICE CO., LTD., Shenzhen (CN)

(72) Inventors: Dawei Li, Nanjing (CN); Li Li, Nanjing (CN); Bo Xu, Nanjing (CN); Ping An, Nanjing (CN); Wei Jin, Nanjing (CN); Yinghao Li, Nanjing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 165 days.

(21) Appl. No.: 16/770,835

(22) PCT Filed: May 8, 2018

(86) PCT No.: PCT/CN2018/086084
§ 371 (c)(1),
(2) Date: Jun. 8, 2020

(87) PCT Pub. No.: WO2019/114185
PCT Pub. Date: Jun. 20, 2019

(65) Prior Publication Data
US 2021/0168194 A1    Jun. 3, 2021

(30) Foreign Application Priority Data
Dec. 12, 2017   (CN) .......................... 201711320141.1

(51) Int. Cl.
*G06F 9/54*   (2006.01)
*H04L 67/10*   (2022.01)
(Continued)

(52) U.S. Cl.
CPC .......... *H04L 67/10* (2013.01); *G06F 3/04817* (2013.01); *G06F 9/452* (2018.02); *G06F 9/546* (2013.01); *G06F 9/547* (2013.01)

(58) Field of Classification Search
CPC ..... H04L 67/10; H04L 29/06; G06F 3/04817; G06F 9/452; G06F 9/546; G06F 9/547; G06F 9/455
See application file for complete search history.

(56) References Cited

U.S. PATENT DOCUMENTS 8,117,240 B1   2/2012   Shelby, III
8,941,673 B2   1/2015   Larsson
(Continued)

FOREIGN PATENT DOCUMENTS

| CN | 102270152 A | 12/2011 |
|----|-------------|---------|
| CN | 103176804 A | 6/2013  |
| CN | 103593227 A | 2/2014  |

OTHER PUBLICATIONS

European Search Report for Application No. 18887335.0 dated May 6, 2021, 10 pages.

*Primary Examiner* — Jennifer N Welch
*Assistant Examiner* — Amy P Hoang

(57) ABSTRACT

An APP remote control method and related devices, wherein method includes: a service device receiving a first operation instruction, where the first operation instruction is generated by a terminal device based on a first input on a start of an application icon of a first application program, and/or on a user interface of the first application program, the first application program runs on the service device, and the application icon and the user interface of the first application program are displayed on the terminal device; the service device responding to the first operation instruction through the first application program, and generating a first response result; and the service device extracting a first interface
(Continued)

drawing instruction from the first response result, and sending it to the terminal device, where the first interface drawing instruction is used to draw an interface.

20 Claims, 12 Drawing Sheets

(51) Int. Cl.
  *G06F 9/451* (2018.01)
  *G06F 3/04817* (2022.01)

(56) References Cited

U.S. PATENT DOCUMENTS

| | | | |
|---|---|---|---|
| 9,148,494 B1 | 9/2015 | Tiberi | |
| 9,245,047 B2 | 1/2016 | Kominac et al. | |
| 2008/0034071 A1* | 2/2008 | Wilkinson | H04L 67/1023 |
| | | | 709/220 |
| 2010/0268813 A1* | 10/2010 | Pahlavan | G06F 9/452 |
| | | | 709/224 |
| 2014/0214925 A1* | 7/2014 | Thomas | H04L 67/02 |
| | | | 709/203 |
| 2016/0142784 A1 | 5/2016 | Song et al. | |
| 2019/0079787 A1* | 3/2019 | Toksoz | G06F 9/452 |
| 2019/0205147 A1* | 7/2019 | Huang | G06F 3/0484 |

* cited by examiner

APP REMOTE CONTROL METHOD AND RELATED DEVICES

CROSS-REFERENCE TO RELATED APPLICATIONS

This application is a national stage of International Application No. PCT/CN2018/086084, filed on May 8, 2018, which claims priority to Chinese Patent Application No. 201711320141.1, filed on Dec. 12, 2017. Both of the aforementioned applications are hereby incorporated by reference in their entireties.

TECHNICAL FIELD

Aspects of the present invention relate to the field of communications technologies, and in particular, to an APP remote control method and related devices.

BACKGROUND

Remote control is a technology in which one computer (for example, namely a main control end or a client) remotely controls another computer (for example, namely a controlled end or a service server end) on a network.

Currently, to implement the remote control between two computers, the service server end usually transmits a to-be-controlled interface to the client in a video stream manner, the client may obtain the to-be-controlled interface after receiving the video stream, thereby performing an operation on the to-be-controlled interface, then the client sends, to the service server end, an instruction corresponding to the operation, or besides sending the instruction, the client also needs to send an operated interface to the service server end in the video stream manner, so that the service server end may perform a corresponding operation based on the received instruction. After completing the operation, if an operated result needs to be sent to the client, the service server end may still send the operated interface in the video stream manner.

For example, in the prior art, a virtual network computer (VNC) is remote control software, capable of transmitting a complete window interface of a computer A to a screen of another computer B through the network, and performing an operation on the computer A through the screen of the computer B. Because the VNC performs communication based on a remote frame buffer (RFB) protocol, and the RFB is an application layer protocol based on a TCP (because the RFB works on a frame buffer level), the client in the VNC transfers an event message to the service server end, and the service server end transfers a corresponding original image to the client through a rectangle sequence (a pixel value/data of a rectangle region with a size of x*y).

Above all, in the prior art, the remote control is usually implemented by transmitting the video stream. However, video stream transmission requires a relatively high demand on the network. When the network is unstable, real-time video stream transmission may be affected greatly, and the video stream even cannot be transmitted, so that the remote control cannot be implemented. The video stream transmission also needs to consume a relatively large volume of traffic. Therefore, the remote control in the prior art has problems such as large transmission resource consumption, relatively low transmission efficiency, poor fluency, and the like.

SUMMARY

Embodiments of the present invention provide an APP remote control method and related devices, thereby improving remote control efficiency in a remote control system.

According to a first aspect, an embodiment of the present invention provides an APP remote control method, and the method may include:

receiving, by a service device, a first operation instruction sent by a terminal device, where the first operation instruction is generated by the terminal device based on a first input, the first input includes an input acting on a start of an application icon of a first application program, and/or an input acting on a user interface of the first application program, the first application program runs on the service device, and the application icon of the first application program and the user interface of the first application program are displayed on the terminal device; responding, by the service device, to the first operation instruction through the first application program, and generating a first response result; and extracting, by the service device, a first interface drawing instruction from the first response result, and sending the first interface drawing instruction to the terminal device, where the first interface drawing instruction is used for the terminal device to draw a partial or complete interface corresponding to the first response result.

In this embodiment of the present invention, in the APP remote control, an APP already installed on a service device side is used to respond to an operation instruction that is on the terminal device and that is for the APP, so that a response result is obtained on the service device. By means of extracting an interface drawing instruction (not a video stream) from the response result, the interface drawing instruction corresponding to the response result is sent to the terminal device, so that the terminal device locally draws and generates, based on the interface drawing instruction, an interface corresponding to the response result. Therefore, a manner of implementing the remote control through the video stream is avoided, transmission bandwidth is reduced, and efficiency and fluency that are of the APP remote control are improved.

In a possible implementation, the responding, by the service device, to the first operation instruction through the first application program, and generating a first response result includes: responding, by the service device, to the first operation instruction through the first application program, and obtaining a first hardware instruction through analysis; sending, by the service device, the first hardware instruction to the terminal device, where the first hardware instruction is used to instruct the terminal device to drive the first hardware device to collect data; receiving, by the service device, a collection result that is of the first hardware device and that is sent by the terminal device; and generating, by the service device, a first response result based on the collection result of the first hardware device. In this embodiment of the present invention, after responding to the first operation instruction, the service device obtains a hardware instruction through analysis, it indicates that in this case, related hardware on the terminal device may need to be instructed and driven to collect related data. For example, the first hardware instruction is an instruction that a user actively taps a camera to take a photo, voice recording, map positioning, a sensor to collect data, or the like. In this case, a part or all of content in the first response result returned by the service device is generated based on a hardware collection result fed back by the terminal device, that is, data is collected by using local hardware of the terminal device or a sensor device, to satisfy a real-time performance of the remote control in a scenario in which data exchanges frequently, thereby improving the quality and efficiency of the remote control.

In a possible implementation, the responding, by the service device, to the first operation instruction through the first application program, and generating a first response result includes: invoking, by the service device based on the first operation instruction, a second application program by using the first application program, and generating the first response result; where the first interface drawing instruction is used for the terminal device to draw the partial interface corresponding to the first response result, and the partial interface corresponding to the first response result excludes a user interface of the second application program; and the method further includes: sending, by the service device, a first control instruction to the terminal device, where the first control instruction is used to instruct the terminal device to invoke a local third application program, and the third application program is an application program pre-matching the second application program. In this embodiment of the present invention, the third application may be a local application on the terminal device, and the second application may be a local application that is on the service device and that has the same function as the third application. For example, the third application program is a local input method, a local calculator, local call software, a local dial keyboard, or the like, that is, a local application in which operations are performed frequently, or when the operations are performed, the exchange operation frequency is relatively high. When the first response result includes an action of invoking the second application, the first interface drawing instruction excludes a drawing instruction about the second application, and alternatively, by means of additionally sending a control instruction, the terminal device is instructed to locally invoke the third application having the same function as the second application for displaying, so that overheads of frequent transmission between networks are saved.

In a possible implementation, the service device receives a second operation instruction sent by the terminal device, where the second operation instruction is generated by the terminal device based on a second input, and the second input is an input acting on a user interface of the third application program; the service device responds to the second operation instruction through the second application program invoked by the first application program, and generates a second response result; and the service device extracts a second interface drawing instruction from the second response result, and sends the second interface drawing instruction to the terminal device, where the second interface drawing instruction is used for the terminal device to draw a partial interface corresponding to the second response result, and the partial interface corresponding to the second response result excludes the user interface of the second application program. In this embodiment of the present invention, after the third application is invoked on the terminal device and the operation acted by the user on the third application is received, the instruction corresponding to the operation is sent to the service device, the operation is responded to through the second application on the service device, so that the response result is output. Finally, the response result is returned to the terminal device in an interface drawing instruction manner, and the interface drawing instruction still does not need to include the user interface of the second application.

In a possible implementation, the service device receives a first message sent by a service server, where the first message is a receiving message of the first application program; the service device responds to the first message through the first application program, and generates a third response result; and the service device extracts a third interface drawing instruction from the third response result, and sends the third interface drawing instruction to the terminal device, where the third interface drawing instruction is used for the terminal device to draw a partial or complete interface corresponding to the third response result. In this embodiment of the present invention, when the terminal device has a message coming from the service server (for example, a QQ server, a WeChat server, or the like) instead of having an operation instruction coming from the terminal device, the terminal device only needs to reactively receive the first message (for example, a picture, a character, or the like) coming from the service server, that is, the service device actively sends the interface drawing instruction of the first message to the terminal device, so that the terminal device locally draws and generates, based on the third interface drawing instruction, a third response result corresponding to the first message.

In a possible implementation, the method further includes: extracting, by the service device, a second hardware instruction from the third response result, and sending the second hardware instruction to the terminal device, where the second hardware instruction is used to instruct the terminal device to drive, based on the second hardware instruction, a second hardware device to perform an output. In this embodiment of the present invention, the message reactively received by the terminal device side may also include a hardware output message. Therefore, besides needing to send the interface drawing instruction, the service device also needs to send the hardware instruction, to drive a corresponding hardware device on the terminal device to perform a hardware data output.

In a possible implementation, the interface drawing instruction sent by the service device to the terminal device is subject to serialization and compression processing. In this embodiment of the present invention, after extracting the first interface drawing instruction and/or the second interface drawing instruction, and before sending the first interface drawing instruction and/or the second interface drawing instruction to the terminal device, the service device needs to serialize and compress the extracted interface drawing instruction, to reduce a data transmission volume of the interface drawing instruction, so that bandwidth consumption is further reduced.

According to a second aspect, an embodiment of the present invention provides an APP remote control method, and the method may include:

receiving, by a terminal device, a first input, and generating a first operation instruction based on the first input, where the first input includes an input acting on a start of an application icon of a first application program, and/or an input acting on a user interface of the first application program, the first application program runs on the service device, and the application icon of the first application program and the user interface of the first application program are displayed on the terminal device; sending, by the terminal device, the first operation instruction to the service device, where the first operation instruction is used for the service device to respond to the first operation instruction through the first application program and generate a first response result; receiving, by the terminal device, a first interface drawing instruction sent by the service device, where the first interface drawing instruction is extracted by the service device from the first response result; and drawing, by the terminal device based on the first interface drawing instruction, a partial or complete interface corresponding to the first response result.

In a possible implementation, the first response result is a response result generated by the service device based on the first operation instruction, by invoking a second application program by using the first application program; and the first interface drawing instruction is used for the terminal device to draw the partial interface corresponding to the first response result, and the partial interface corresponding to the first response result excludes a user interface of the second application program; and the method further includes: receiving, by the terminal device, a first control instruction sent by the service device; and invoking, by the terminal device, a local third application program based on the first control instruction, where the third application program is an application program pre-matching the second application program.

In a possible implementation, the first response result is a response result generated by the service device based on the first operation instruction, by invoking a second application program by using the first application program; and the first interface drawing instruction is used for the terminal device to draw the partial interface corresponding to the first response result, and the partial interface corresponding to the first response result excludes a user interface of the second application program; and the method further includes: receiving, by the terminal device, a first control instruction sent by the service device; and invoking, by the terminal device, a local third application program based on the first control instruction, where the third application program is an application program pre-matching the second application program.

In a possible implementation, the terminal device sends a second operation instruction to the service device, where the second operation instruction is generated by the terminal device based on a second input, and the second input is an input acting on a user interface of the third application program; the terminal device receives a second interface drawing instruction sent by the service device, where the second interface drawing instruction is extracted by the service device from a second response result, and the second response result is a response result generated after the service device responds to the second operation instruction through the second application program invoked by the first application program; and the terminal device draws, based on the second interface drawing instruction, a partial interface corresponding to the second response result, where the partial interface excludes the user interface of the second application program.

With reference to any implementation of the foregoing first aspect or second aspect, in a possible implementation, the terminal device receives a second hardware instruction sent by the service device, where the second hardware instruction is extracted by the service device from the third response result; and the terminal device drives, based on the second hardware instruction, the second hardware device to perform an output.

With reference to any implementation of the foregoing first aspect or any implementation of the second aspect, in a possible implementation, a response result generated by the service device includes a first image resource, and the first image resource is an image resource greater than a preset threshold; when the first image resource is buffered on the terminal device, the interface drawing instruction extracted by the service device from the response result includes a first identifier, and the first identifier is used to instruct the terminal device to display the first image resource based on a buffer of the first image resource; and when the first image resource is not buffered on the terminal device, the interface drawing instruction extracted by the service device from the response result includes an image drawing instruction of the first image resource. In this embodiment of the present invention, when the response result has a relatively large image, the service device first determines whether there is a buffer of the relatively large image on the terminal device, if there is a buffer of the relatively large image, only the interface drawing instruction needs to include an identifier of the buffered image; and if there is no buffer of the relatively large image, the interface drawing instruction needs to include an image drawing instruction of the image. Therefore, when the response result has a relatively large image, a transmission resource of the remote control is saved, and the efficiency of the remote control is improved.

With reference to any implementation of the foregoing first aspect or any implementation of the second aspect, in a possible implementation, the interface drawing instruction extracted by the service device from the generated response result includes a Canvas instruction at a View layer of an Android operating system and an OpenGL instruction at a Libraries layer of the Android operating system. The generated response result may be the first response result and/or the second response result. Correspondingly, the interface drawing instruction may be the first interface drawing instruction and/or the second interface drawing instruction. In this embodiment of the present invention, the interface drawing instruction may include an instruction at a related layer of the Android operating system.

According to a third aspect, an embodiment of the present invention provides a service device, and the service device may include:

a first receiving unit, configured to receive a first operation instruction sent by a terminal device, where the first operation instruction is generated by the terminal device based on a first input, the first input includes an input acting on a start of an application icon of a first application program, and/or an input acting on a user interface of the first application program, the first application program runs on the service device, and the application icon of the first application program and the user interface of the first application program are displayed on the terminal device;

a first output unit, configured to: respond to the first operation instruction through the first application program, and generate a first response result; and a first sending unit, configured to: extract a first interface drawing instruction from the first response result, and send the first interface drawing instruction to the terminal device, where the first interface drawing instruction is used for the terminal device to draw a partial or complete interface corresponding to the first response result.

In a possible implementation, the first output unit is specifically configured to:

respond to the first operation instruction through the first application program, and obtain a first hardware instruction through analysis; send the first hardware instruction to the terminal device, where the first hardware instruction is used to instruct the terminal device to drive the first hardware device to collect data; receive a collection result that is of the first hardware device and that is sent by the terminal device;

and generate the first response result based on the collection result of the first hardware device.

In a possible implementation, the first output unit is specifically configured to:

invoke, based on the first operation instruction, a second application program by using the first application program, and generate the first response result; where the first interface drawing instruction is used for the terminal device to draw the partial interface corresponding to the first response result, and the partial interface corresponding to the first response result excludes a user interface of the second application program; and the service device further includes:

a first control unit, configured to send a first control instruction to the terminal device, where the first control instruction is used to instruct the terminal device to invoke a local third application program, and the third application program is an application program pre-matching the second application program.

In a possible implementation, the service device further includes:

a second receiving unit, configured to receive a second operation instruction sent by the terminal device, where the second operation instruction is generated by the terminal device based on a second input, and the second input is an input acting on a user interface of the third application program;

a second output unit, configured to: respond to the second operation instruction through the second application program invoked by the first application program, and generate a second response result; and a second sending unit, configured to: extract a second interface drawing instruction from the second response result, and send the second interface drawing instruction to the terminal device, where the second interface drawing instruction is used for the terminal device to draw a partial interface corresponding to the second response result, and the partial interface corresponding to the second response result excludes the user interface of the second application program.

In a possible implementation, the service device further includes:

a third receiving unit, configured to receive a first message sent by a service server, where the first message is a receiving message of the first application program;

a third output unit, configured to: respond to the first message through the first application program, and generate a third response result; and a third sending unit, configured to: extract a third interface drawing instruction from the third response result, and send the third interface drawing instruction to the terminal device, where the third interface drawing instruction is used for the terminal device to draw a partial or complete interface corresponding to the third response result.

In a possible implementation, the service device further includes:

a fourth sending unit, configured to: extract a second hardware instruction from the third response result, and send the second hardware instruction to the terminal device, where the second hardware instruction is used to instruct the terminal device to drive, based on the second hardware instruction, a second hardware device to perform an output.

In a possible implementation, the interface drawing instruction sent by the service device to the terminal device is subject to serialization and compression processing.

According to a fourth aspect, an embodiment of the present invention provides a terminal device, and the terminal device may include:

a first receiving unit, configured to receive a first input, and generate a first operation instruction based on the first input, where the first input includes an input acting on a start of an application icon of a first application program, and/or an input acting on a user interface of the first application program, the first application program runs on the service device, and the application icon of the first application program and the user interface of the first application program are displayed on the terminal device;

a first sending unit, configured to send the first operation instruction to the service device, where the first operation instruction is used for the service device to respond to the first operation instruction through the first application program and generate a first response result;

a second receiving unit, configured to receive a first interface drawing instruction sent by the service device, where the first interface drawing instruction is extracted by the service device from the first response result; and a first drawing unit, configured to draw, based on the first interface drawing instruction, a partial or complete interface corresponding to the first response result.

In a possible implementation, the terminal device further includes:

a third receiving unit, configured to receive a first hardware instruction of the service device, where the first hardware instruction is a hardware instruction obtained through analysis after the service device responds to the first operation instruction through the first application program;

a first collection unit, configured to drive, based on the first hardware instruction, a first hardware device to collect data, and obtain a collection result of the first hardware device; and a second sending unit, configured to send the collection result of the first hardware device to the service device.

In a possible implementation, the first response result is a response result generated by the service device based on the first operation instruction, by invoking a second application program by using the first application program; and the first interface drawing instruction is used for the terminal device to draw the partial interface corresponding to the first response result, and the partial interface corresponding to the first response result excludes a user interface of the second application program; and the terminal device further includes:

a fourth receiving unit, configured to receive a first control instruction sent by the service device; and a first invocation unit, configured to invoke a local third application program based on the first control instruction, where the third application program is an application program pre-matching the second application program.

In a possible implementation, the terminal device further includes:

a third sending unit, configured to send a second operation instruction to the service device, where the second operation instruction is generated by the terminal device based on a second input, and the second input is an input acting on a user interface of the third application program;

a fifth receiving unit, configured to receive a second interface drawing instruction sent by the service device, where the second interface drawing instruction is extracted by the service device from a second response result, and the second response result is a response result generated after the service device responds to the second operation instruction through the second application program invoked by the first application program; and a second drawing unit, configured to draw, based on the second interface drawing instruction, a partial interface corresponding to the second response result, where the partial interface excludes the user interface of the second application program.

In a possible implementation, the terminal device further includes:

a sixth receiving unit, configured to receive a third interface drawing instruction sent by the service device, where the third interface drawing instruction is extracted by the service device from a third response result, the third response result is output after the service device responds to a first message through the first application program, and the first message is a receiving message of the first application program; and a third drawing unit, configured to draw, based on the third interface drawing instruction, a partial or complete interface corresponding to the third response result.

In a possible implementation, the terminal device further includes:

a seventh receiving unit, configured to receive a second hardware instruction sent by the service device, where the second hardware instruction is extracted by the service device from the third response result; and a first output unit, configured to drive, based on the second hardware instruction, a second hardware device to perform an output.

With reference to any implementation of the foregoing third aspect or any implementation of the fourth aspect, in a possible implementation, a response result generated by the service device includes a first image resource, and the first image resource is an image resource greater than a preset threshold; when the first image resource is buffered on the terminal device, the interface drawing instruction extracted by the service device from the response result includes a first identifier, and the first identifier is used to instruct the terminal device to display the first image resource based on a buffer of the first image resource; and when the first image resource is not buffered on the terminal device, the interface drawing instruction extracted by the service device from the response result includes an image drawing instruction of the first image resource.

With reference to any implementation of the foregoing third aspect or any implementation of the fourth aspect, the interface drawing instruction extracted by the service device from the generated response result includes a Canvas instruction at a View layer of an Android operating system and an OpenGL instruction at a Libraries layer of the Android operating system.

According to a fifth aspect, this application provides a service device, and the application service server has a function implementing the method in any APP remote control method embodiment. The function may be implemented by hardware, or may be implemented by hardware by executing corresponding software. The hardware or the software includes one or more modules corresponding to the foregoing function.

According to a sixth aspect, this application provides a terminal device, and the terminal device has a function implementing the method in any APP remote control method embodiment. The function may be implemented by hardware, or may be implemented by hardware by executing corresponding software. The hardware or the software includes one or more modules corresponding to the foregoing function.

According to a seventh aspect, this application provides a service device, the service device includes a processor, and the processor is configured to support the service device to execute a corresponding function in an APP remote control method according to the first aspect. The service device may further include a memory, the memory is configured to couple to the processor, and store a necessary program instruction and necessary data for the service device. The service device may further include a communications interface, configured to perform communication between the service device and another device or a communications network.

According to an eighth aspect, this application provides a terminal device, the terminal device includes a processor, and the processor is configured to support the terminal device to execute a corresponding function in an APP remote control method according to the second aspect. The terminal device may further include a memory, the memory is configured to couple to the processor, and store a necessary program instruction and necessary data for the terminal device. The terminal device may further include a communications interface, configured to perform communication between the terminal device and another device or a communications network.

According to a ninth aspect, this application provides a computer storage medium, configured to store a computer software instruction used by the service device according to the foregoing seventh aspect, and the computer software instruction includes a program designed to implement the foregoing aspects.

According to a tenth aspect, this application provides a computer storage medium, configured to store a computer software instruction used by the terminal device according to the foregoing eighth aspect, and the computer software instruction includes a program designed to implement the foregoing aspects.

According to an eleventh aspect, an embodiment of the present invention provides a computer program, the computer program includes an instruction, and when the computer program is executed by a computer, the computer may be enabled to perform the process in any APP remote control method in the foregoing first aspect or second aspect.

According to a twelfth aspect, this application provides a chip system, the chip system includes a processor, configured to support the service device or terminal device to implement the function involved in the foregoing aspects, for example, extracting the interface drawing instruction involved in the foregoing APP remote control method. In a possible design, the chip system further includes a memory, and the memory is configured to store a necessary program instruction and necessary data for the service device or terminal device. The chip system may include a chip, or may include a chip and another discrete device.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

Figure 1:
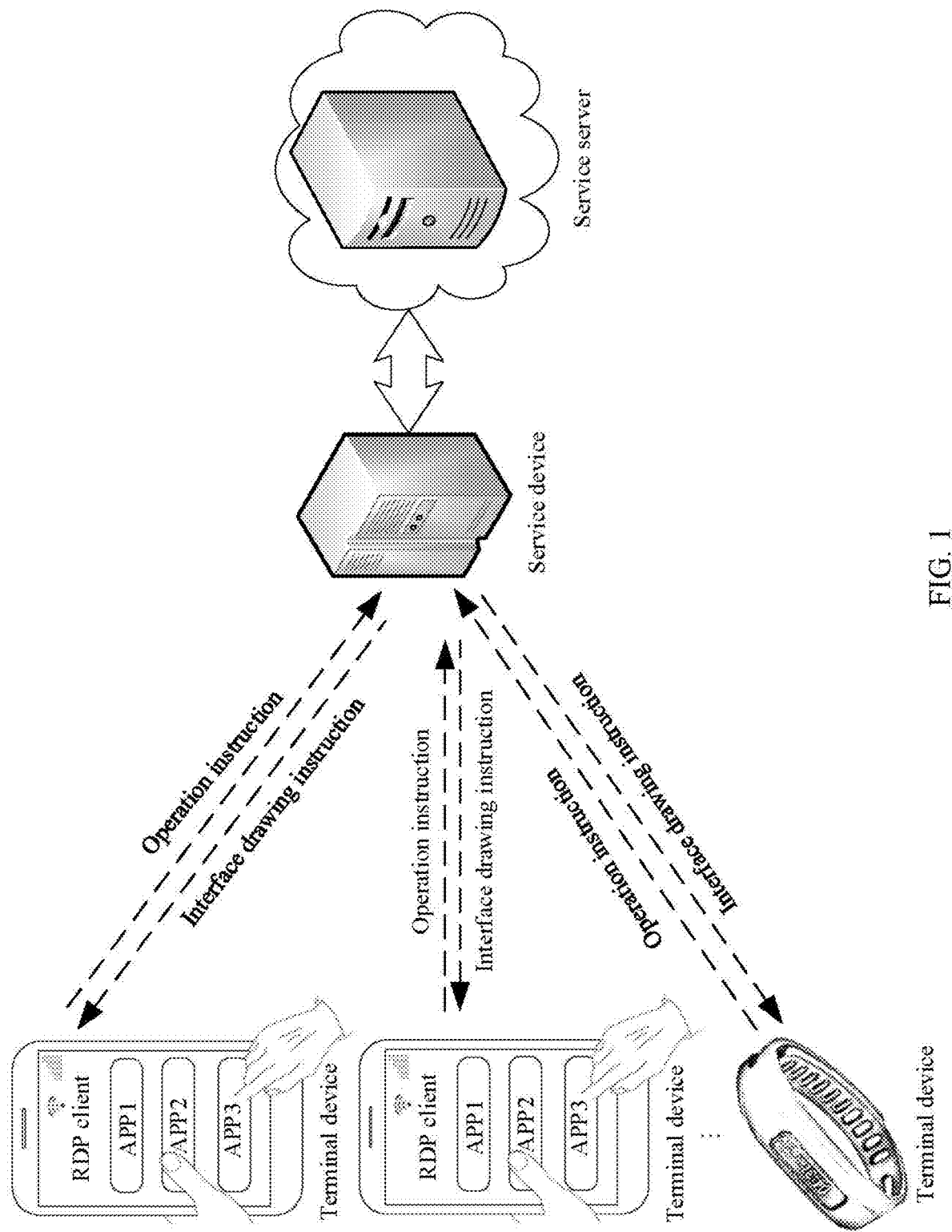
FIG. 1 is a communications system architectural diagram according to an embodiment of the present invention.

The following describes the embodiments of the present invention with reference to the accompanying drawings in the embodiments of the present invention.

In the specification, claims, and accompanying drawings of this application, the terms "first", "second", "third", "fourth" and so on are intended to distinguish between different objects but do not indicate a particular order. In addition, the terms "including", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. The term "and/or" describes an association relationship between associated objects and indicates that three relationships may exist. For example, A and/or B may indicate the following three cases: Only A exists, both A and B exist, and only B exists.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

Some terms in this application are first described, so as to help persons skilled in the art have a better understanding.

(1) An application program may be an application (APP), and referred to as a computer program for completing one or more particular work, that is, program design languages that a user may use and a set of application programs compiled by the program design languages. The application program is divided into an application software package and a user program, for example, an application downloaded by various types of operating systems on a mobile phone or a computer; or the application program may be referred to as an executable application program in which an operating system of the terminal device has some functions.

(2) Application programming interfaces (API) are some predefined functions, and aim to provide a capability of which the application program and a developer can access a group of routines based on software or hardware, without needing to access source code, or understanding details of internal working mechanism.

(3) An open graphics library (OpenGL) is a professional graphics program interface, and is an underlying graphics library that has a strong function and that can be invoked conveniently.

(4) A graphics processing unit (GPU), also called a display core, a visual processor, or a display chip, is a microprocessor specifically performing an image operation on a personal computer, a workstation, a game machine, and some mobile devices (such as a tablet computer, a smartphone, and the like). The graphics processing unit is configured to perform conversion and driving on display information that a computer system needs, and provide a display with a row scanning signal, to control the display to display correctly. The graphics processing unit is an important component of connecting the display and a personal computer mainboard, and also is one of important devices of "human-computer interaction". A display card, as an important component part in a computer host, bears a task of outputting the display graphics. The display card is very important for a person working on the professional graphics design.

(5) A graphical user interface (GUI) system of Android is a window system of a client/service server (Client/Server, C/S) model, that is, a background runs one surface flinger (Surface Flinger), and when a client program needs to draw a screen, a service end is first requested to create a window, and then content is drawn on the window. Each client senses that the screen is occupied independently by the client; and the service end may allocate a different layer value to each client window and dynamically change a layer value of the window based on a user interaction status. A process of displaying by the Android application program is briefly summarized as: invoking, by the Android application program, the Surface Flinger to render the measured, placed, and drawn Surface to a display screen. The Surface Flinger serves for the Android system, and is responsible for managing a frame buffer of the Android system, that is, the display screen. The Surface is used to describe a drawing plane, and the inside of the Surface includes a size of the plane, a location of the plane on the screen, and a section of memory of the screen buffer.

(6) A Canvas instruction is a drawing instruction set, and includes various drawing functions, for example, drawColor( ), drawText( ), DrawCircleOp, and the like.

(7) A hardware abstraction layer (HAL) is located at an interface layer between an operating system kernel and a hardware circuit, and aims to abstract the hardware. The hardware abstraction layer hides a hardware interface detail of a particular platform, and provides the operating system with a virtual hardware platform, so that the operating system has hardware independence and may perform migrations on multiple platforms. From the perspective of the software and hardware test, the software and hardware test work may be respectively completed based on the hardware abstraction layer, so that the software and hardware test work may be probably performed in parallel.

Secondly, an application scenario of this application and a technical problem that needs to be resolved are proposed. With the development of the communication technology, the remote control is not only involved between personal computers (PC), the remote control between various mobile intelligent terminals, or between the service server and the mobile intelligent terminal also becomes more popular, for example, a fat client/thin client mode, a fat service server/thin client mode, and the like, that is, the fat client/fat service server with a relatively strong processing capability is configured to complete most functions, such as information storage, information processing, and the like, while the thin client with a relatively poor processing capability is only used as a tool for interacting with the user. Scenarios to which the remote control solution is applied in this application are listed below by using examples, and may specifically include the following scenario 1 and scenario 2.

Scenario 1: Remote control between devices of different operating systems.

For example, an operating system of a terminal device 1 is a platform such as Windows, IOS, or the like. However, the user needs to download and use an Android application (Application, APP) through the terminal device 1, in this case, because the operating system of the terminal device 1 is not an Android system, the operating system of the terminal device 1 cannot be used or is incompatible with the Android APP, resulting in poor user experience. By means of applying the APP remote control method in this application, the Android APP may be processed by using an Android operating system installed on a terminal device 2 (that is, the service device in this application) as a proxy, and a processing result is synchronized to the terminal device 1 in real time. Therefore, the user of the terminal device 1 may use the Android APP across the operating system without needing to install the Android APP, thereby implementing the remote control of the mobile phone APP, and satisfying a function requirement such as remote assistance, or the like.

Scenario 2: Cloud management between devices of the same or different operating systems.

For example, the terminal device 1, as a thin client, needs to use the fat service server or the fat client as a service end to perform the cloud management. Therefore, an APP1 does not need to be actually installed on the terminal device 1, while the APP1 needs to be actually installed on the terminal device 2 (that is, the service device in this application). Therefore, the terminal device 2 actually runs the APP1, and synchronizes a running result to the terminal device 1 in real time, and the user performs a visualized interaction operation on the APP1 through the terminal device 1, so that related services of the APP1 that are provided by the terminal device 2 or by using a service server 1 as a cloud may be experienced without needing to actually install the APP1 on the terminal device 1. The APP on the terminal device side is deployed on the cloud, so that a large quantity of APPs do not need to be deployed on the terminal device any more. Implementing the cloud storage of mobile phone data may quickly change the mobile phone and perform the smooth migration of the data. It may be understood that, the fat service server, as the service end, may have a plurality of virtual operating systems, and simultaneously provides a cloud service for a plurality of thin clients.

Above all, in the foregoing scenario, one of devices (the terminal device or the service server) needs to be used as a running processing device of an APP, and the other device (the terminal device) is used as an interface display interaction tool of the APP. Therefore, a process of transmitting the processing result (an interaction interface) of the APP between two devices in real time is involved. However, because the interaction interface has a large transmission data volume, and requires a high demand on a transmission real time performance, if the video stream transmission manner in the prior art is used, problems such as large traffic consumption, poor fluency, and a poor text display effect are encountered. Therefore, a problem that needs to be resolved in this application is how to improve the efficiency and display effect of transmitting the processing result of the APP between two devices in real time.

Based on the foregoing descriptions, the following first describes a communications system architecture on which the embodiments of the present invention are based. FIG. 1 is a communications system architectural diagram according to an embodiment of the present invention, the communications system architecture may include a plurality of terminal devices (for example, a smartphone or a smart band), a service device (for example, a server or a terminal device), and at least one service server (for example, a service server of a social software APP1). In FIG. 1, the terminal device, as a display interaction tool of the APP1, provides a user with a visualized operation interaction interface, and the service device, as a storage processing service end of the APP1, actually runs the APP1, thereby obtaining a data source of the foregoing visualized operation interaction interface synchronized to the terminal device side.

The terminal device, as the display interaction tool of the APP1, receives and captures an operation instruction (the operation instruction such as pressing, tapping, double-touching, swiping, or the like) of the user, and then sends the operation instruction to the service device. The terminal device in this application may be a terminal device that installs any operating system, for example, the operating system may include Android, iOS, Windows, and the like. The terminal device in this application may further be user equipment (UE), a station (ST) in a wireless local area network (WLAN), a cellular phone, a wireless local loop (WLL) station, a personal digital assistant (PDA) device, a handheld device having a wireless communications function, a computing device, another processing device connected to a wireless modem, an in-vehicle device, a wearable device, or the like.

Figure 2A:
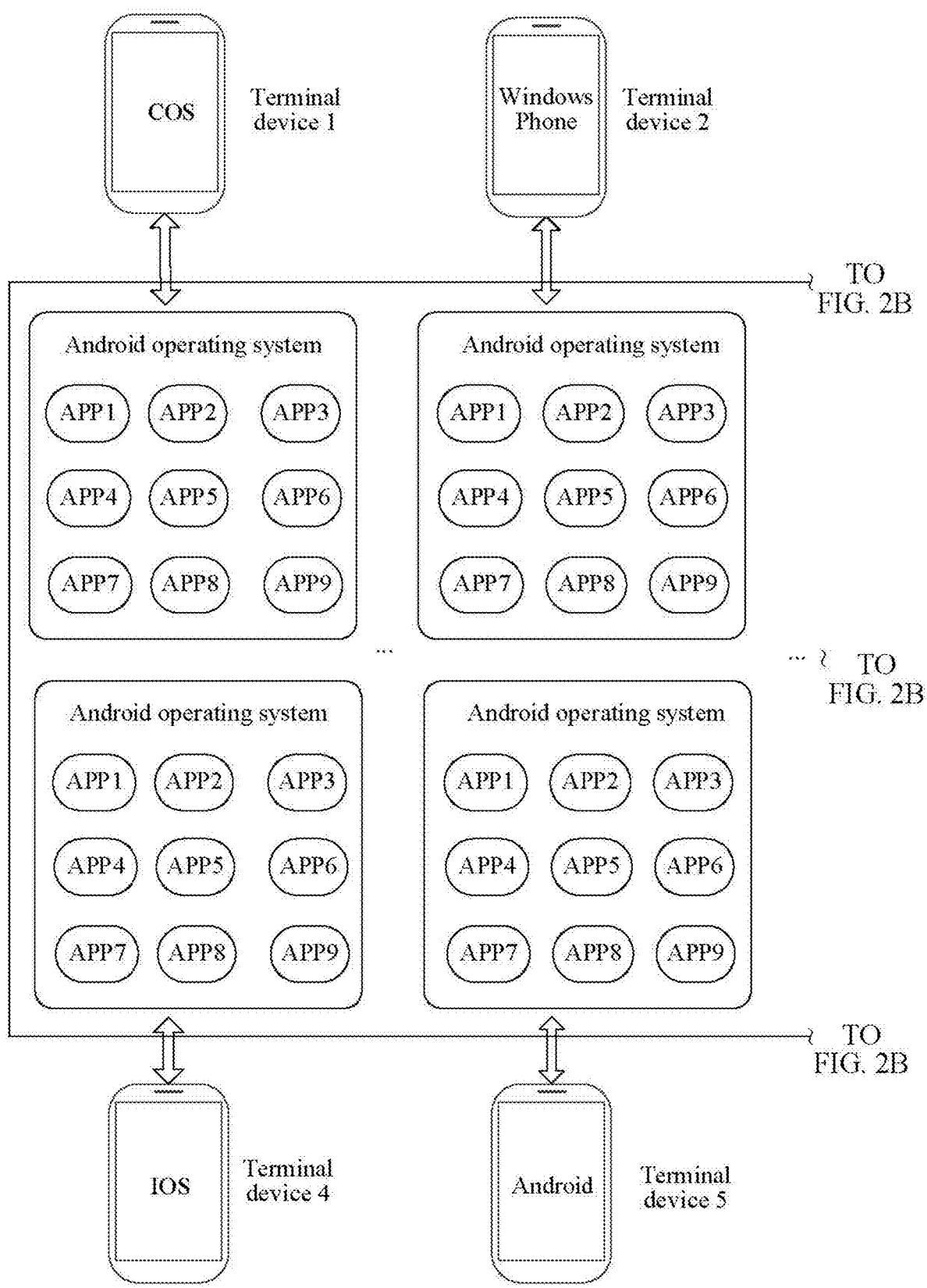
FIG. 2A and FIG. 2B are schematic diagrams of a remote control scenario provided based on the foregoing system architecture according to an embodiment of the present invention.
Figure 2B:
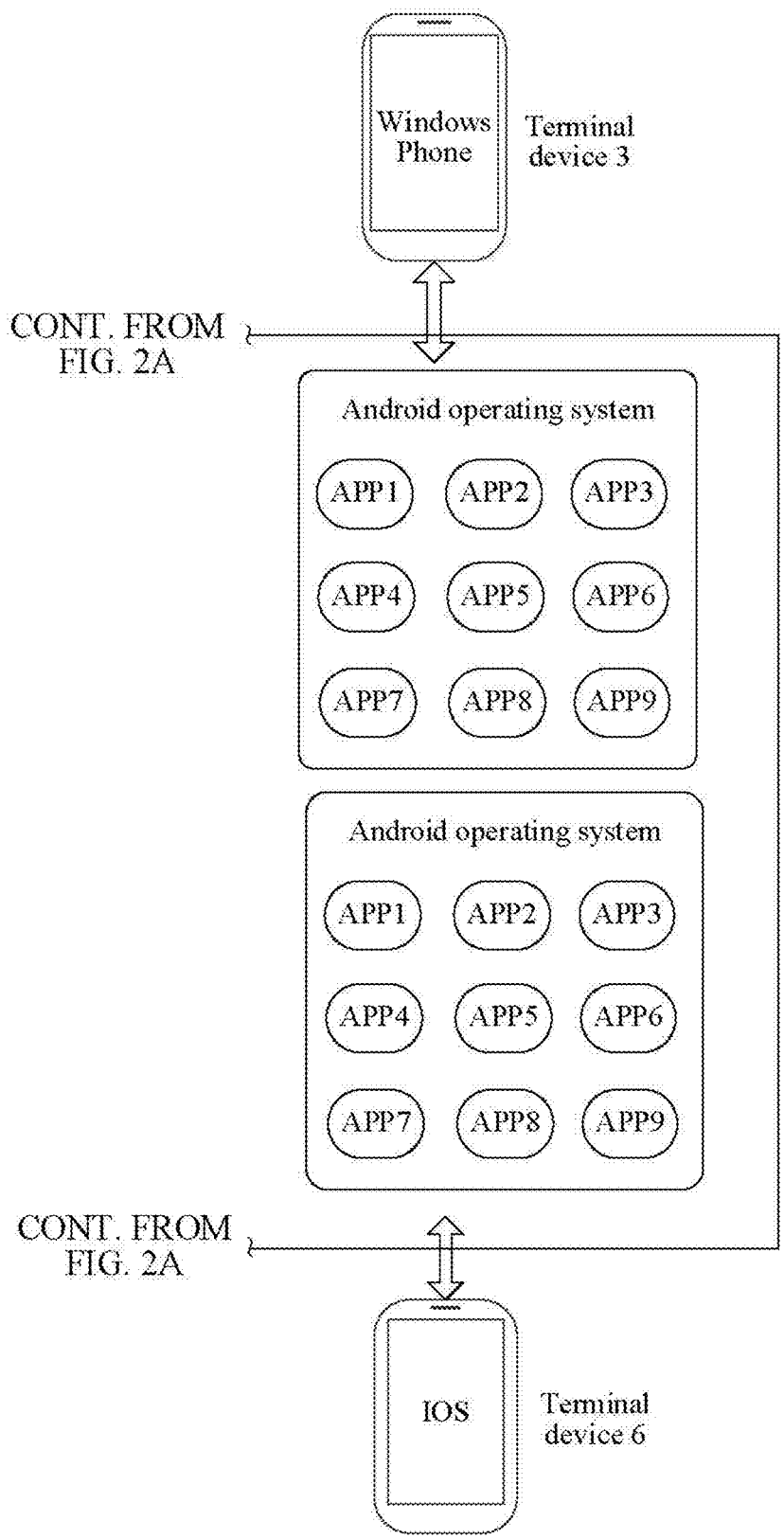

After receiving the operation instruction that is of the user and that is captured by the terminal device, the service device injects the operation instruction to the APP1 installed on the service device through the related API (that is, the operation instruction of the user is simulated and executed on the APP1 installed on the service device), and after obtaining an operation response result, the service device extracts an interface drawing instruction in the operation response result, and sends the interface drawing instruction to the terminal device. In this time, the user completes performing an operation on the APP1 and responding to the APP1 through the remote control between the terminal device and the service device. The service device in this application is a remote, far end, or cloud control device of the terminal device, may be a cloud service server, or may be a remote control terminal device. For example, the service device may be an Android terminal device, that is, a terminal device that installs an Android operating system, or may be an Android cloud service server that installs a virtual machine that installs the Android operating system. Because extracting of the interface drawing instruction in this application is involved, an operating system kernel needs to be modified, and the operating system installed on the service device in this application is the Android operating system that allows to be configured to support the APP remote control method and related interface drawing that are provided in this application. For example, FIG. 2A and FIG. 2B are schematic diagrams of a remote control scenario provided based on the foregoing system architecture according to an embodiment of the present invention. In the scenario, the service device has a plurality of virtual Android operating systems, a terminal device is separately a smartphone that installs an operating system such as COS, Android, iOS, Windows, or the like, the smartphone provides a service for the terminal device through an APP installed on the virtual Android systems on the service device, and the terminal device is only used as an interaction display tool.

Optionally, the service server provides a related business service for the foregoing APP1 installed on the service device. It may be understood that, when a first application program in this application is a local application, for example, a notepad, a calculator, a local small game, or the like, the service server does not participate in the interaction in this application. When the first application program in this application is an interactive application, for example, a mobile payment application, a video playing application, a mobile browser, a mobile social application, or the like, the service server needs to participate in the interaction. For example, the service server is a payment service server, a video service server, a content service server, a social service server, or the like.

It may be understood that, the communications system architecture in FIG. 1 is only an exemplary implementation in this embodiment of the present invention, and the communications system architecture in this embodiment of the present invention includes but is not limited to the foregoing communications system architecture.

Figure 3:
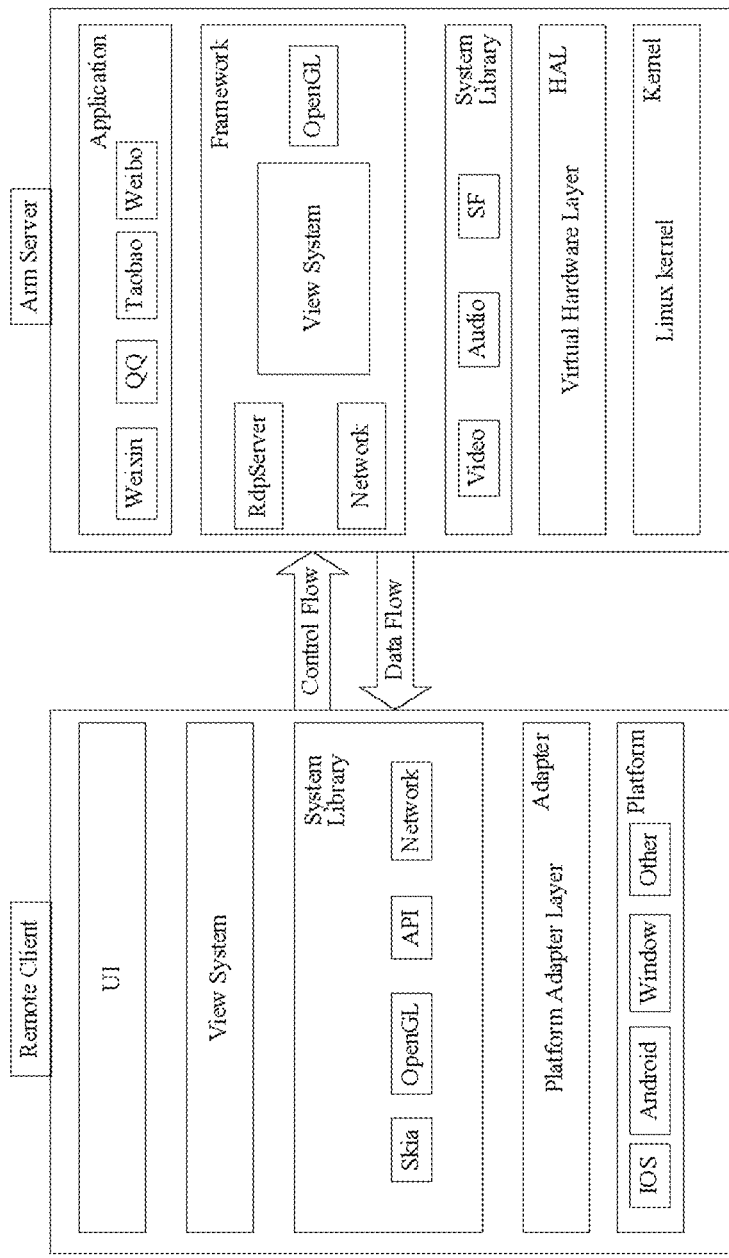
FIG. 3 is a C/S system architectural diagram according to an embodiment of the present invention.

Based on the system architecture in the foregoing FIG. 1, this embodiment of the present invention provides a client/service server (Client/Server, C/S) system architecture, configured to implement the APP remote control method in this application. As shown in FIG. 3, FIG. 3 is a C/S system architectural diagram according to an embodiment of the present invention, and the system architecture includes one Client and one Server, respectively installed on the terminal device and the service device. For example, the Client is an application program RDP (remote desktop) Client process that runs on any operating system (the IOS, Android, Windows, or the like), and the Server is a service process (including an RDP Server and Surface Finger) in the Android operating system kernel. The terminal device interacts with the RDP Server and Surface Finger that are on the service device by installing the foregoing RDP Client process, thereby implementing a function of the client installed on a remote control service device. Based on the foregoing C/S architecture, the following respectively describes system framework diagrams of the terminal device and the service device.

The service device, as a service end (Server), needs to perform a modification or configuration on, for example, the Android operating system kernel. An overall framework of the Server, from top to bottom, is separately: an application (Application) layer, a framework layer, a system library (System Library) layer, a hardware abstraction layer (HAL), and a kernel layer.

(1) The Application layer is configured to run a third party program, for example, the social application WeChat, the shopping application Taobao, or the like.

(2) The Framework layer provides a series of services and an interface of the application program programming interface API for an Android developer. The framework layer may include a View System module, an OpenGL module, an RDP Server module, and a Network module. The View System module is mainly configured to extract a Canvas drawing instruction; the OpenGL module is mainly configured to extract an OpenGL drawing instruction; the RDP Server module is mainly configured to initialize a network, control a start of an APP, and distribute a user operation instruction (such as swiping, tapping, touching, or the like); and the Network module is mainly configured for network communication, sending or receiving a drawing instruction, the user operation instruction, drawing resources on which the instruction dependents such as a picture, a text, and the like.

(3) The System Library layer, a system class library file, is a class library needed when the operating system runs. The System Library layer includes a Video module, an Audio module, and an SF (Surface Finger) module. The Video module is mainly configured to extract the video, the Audio module is mainly configured to extract the audio, and the SF module is mainly configured to extract the layer drawing information.

(4) The HAL & Kernel layer, where the HAL is a hardware abstraction layer. The HAL may include a virtual hardware layer Virtual Hardware Layer, mainly used to extract information such as a speaker, a microphone MIC, a global positioning system GPS, a sensor, and the like; and a Linux kernel is a computer operating system kernel.

The terminal device, as a client, usually exists in a form of APP, EXE, or the like, and may run on a platform such as the IOS, Android, Window, Linux with a plurality of types, or the like. The operating system being Android is used as an example, an overall framework of the Client, from top to bottom, is separately: a UI layer, a View System layer, a System Library layer, an Adapter layer, and a Platform layer.

(1) The UI layer is an interface layer. The UI layer is a visualized interaction interface, and operations performed by the user on the APP are all operations performed on the UI layer. That is, the UI layer is used to receive the operation instruction (such as tapping, swiping, double-touching, pressing, or the like) of the user.

(2) The View System layer is a component that is in the Android and that is used to display interface content. The View System layer is mainly used for the terminal device to perform, based on the Canvas instruction and OpenGL instruction that are in the interface drawing instruction, drawing and place the UI after receiving the interface drawing instruction of the service device. The View System uses a tool to do a specific service, such as drawing a rectangle, where the rectangle is drawn, and when the rectangle is drawn.

(3) The System Library layer, a system class library file, is a class library needed when the system runs. The System Library is a tool library, has a drawing function, a network function, and the like, and may include a Skia module, an OpenGL module, an API module, and a Network module. The Skia module is mainly configured to draw the Canvas instruction and the Surface, and includes 2D graphics and some of 3D graphics; the OpenGL is mainly configured to draw the OpenGL instruction; and the Network module is configured for network interaction between the Client and the Server end, and includes a data flow and a control flow.

(4) The Adapter layer is a platform adaptation layer, and is mainly used to be compatible with a running environment of each platform. Therefore, the Client can run on operating system platforms. The Adapter layer is a platform adaptation layer, that is, may be compatible with the IOS, Android, and Window platform, thereby implementing platform crossing.

(5) The Platform layer is a platform supported by a Client side, that is, an operating system supported by the terminal device side, for example, the platform such as the IOS, Android, Window, or the like.

It may be understood that, the APP remote control method in this embodiment of the present invention may also be based on a browser/service server (Browser/Server, B/S) mode, that is, the Client is changed into a browser, the principle is similar, a related plug-in needs to be installed on the browser, to establish a communications connection with the Server end, and the principle of the remote control is the same.

Based on the system architecture corresponding to the foregoing FIG. 1 and FIG. 3, the following specifically analyzes and resolves the technology problem proposed in this application with reference to the embodiments of the remote control method provided in this application.

Figure 4:
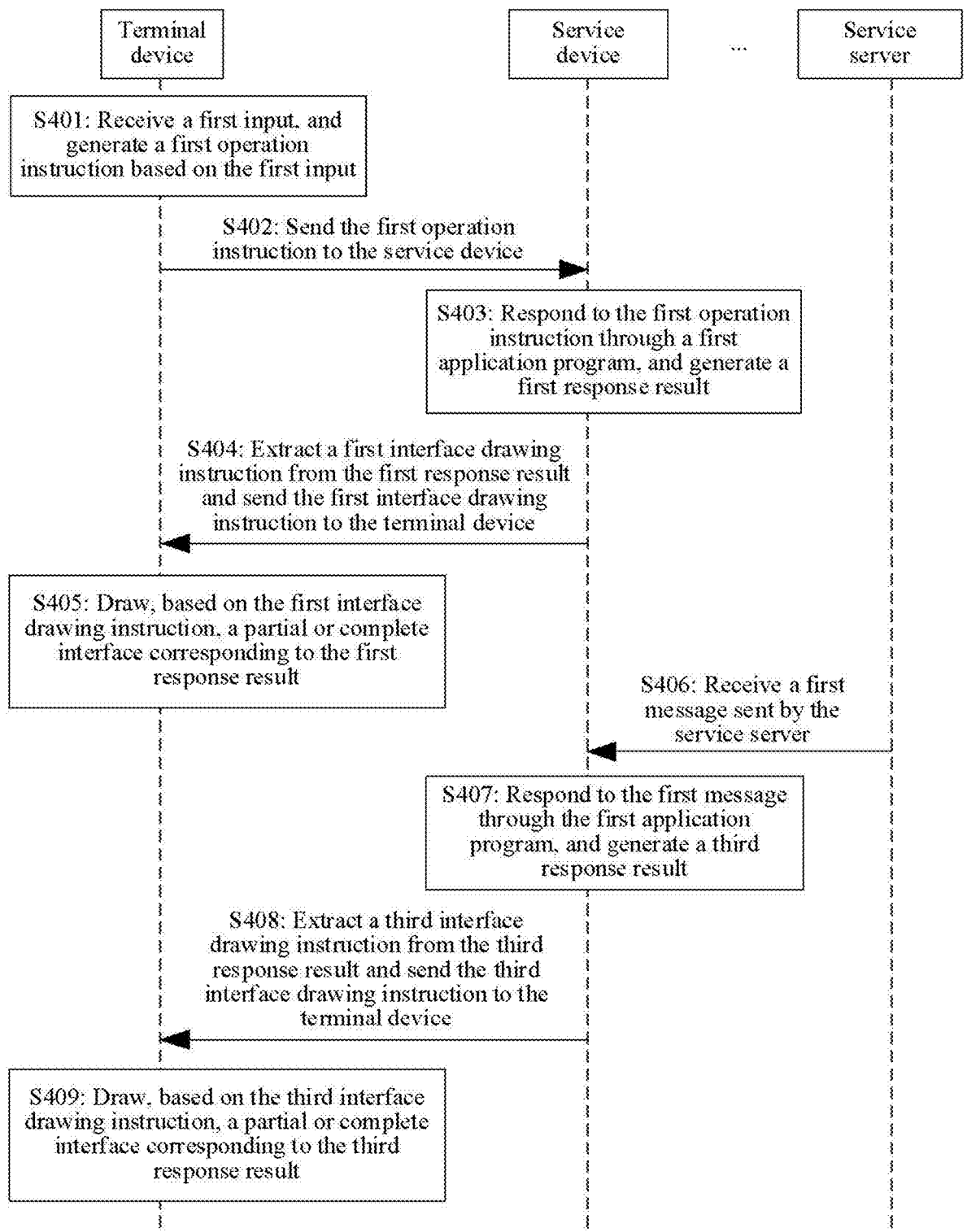
FIG. 4 is a schematic flowchart of an APP remote control method according to an embodiment of the present invention.

FIG. 4 is a schematic flowchart of an APP remote control method according to an embodiment of the present invention, and may be applied to the communications system in the foregoing FIG. 1 or FIG. 3. The following provides descriptions with reference to FIG. 4 from the perspective of an interaction side between the terminal device and the service device, and the method may include the following step S401 to step S403.

Step S401: A terminal device receives a first input, and generates a first operation instruction based on the first input.

Specifically, with reference to the foregoing C/S architecture, a Client on the terminal device first needs to learn of an IP and a port of a service device Server. Then, the Client sends a remote control connection request to the service device through the foregoing IP and port, and after the service device confirms the identity of the terminal device, a communications connection between the terminal device and the service device is established, for example, a Socket linkage based on a TCP/IP protocol is established. It may be understood that, when there are a plurality of virtual Servers on the service device, the communications connection is performed between the terminal device and one of matched virtual Servers on the service device. For example, a WeChat APP is installed on a virtual Android operating system of the Server end, a client APP remotely controlled is started on a Client end mobile phone, and an IP address and a port number of the Server end are set. After the client APP is started, an interface of the WeChat of the Server end is projected to the client APP, and a user performs operations of the WeChat on the client.

The first input received by the terminal device includes an input acting on a start of an application icon of a first application program, and/or an input acting on a user interface of the first application program, the first application program runs on the foregoing service device, and the application icon of the first application program and the user interface of the first application program are displayed on the terminal device. That is, the start of the first application program and a started user interface are displayed on the terminal device, and a data source of the started user interface comes from the first application program that runs on the service device. The first input in this application may include two types, the first one is to start an input operation of opening or enabling the first application program, and the second one is an input operation for the enabled first application program after the first application program is enabled.

When the first input is the input operation of enabling the first application program, the first input may simultaneously be used for the terminal device to request to connect to the service device, and request to enable the first application program on the service device. For the first one, the first input received on the terminal device may be understood as an operation for the interface of a local Client of the terminal device.

When the first input is the input operation for the enabled first application program, the first input is used for the terminal device to request to perform, on the first application program that is on the service device, an operation of a function corresponding to the first input. For the second one, the first input received on the terminal device may be understood as an operation for a current output interface of the first application program on the service device. However, because the output interface is synchronized to the terminal device, the first input is performed on a synchronized interface of the terminal device, but essentially the first input is still a remote operation for the service device. It may be understood that, when there is a display screen on the Server, the foregoing output interface may be displayed, and when the Server is only used as a background service device, the output interface may not be displayed through the display screen. This is not specifically limited in this application.

In the foregoing step S401, the terminal device may receive the first input of the user, and the first input may include operations such as tapping, holding down, double-touching, swiping, and inputting that are for a specific operation area. When receiving and monitoring the first input, the terminal device identifies the first input, and changes the first input into a first operation instruction that can be identified by the service device. For example, when the first input is a "tapping" operation at a location of screen coordinates (100,100), the terminal device may send operation type information ("tapping" in this example) and operation location information (the coordinate points 100,100 in this example) that are of the operation to the service device, and the service device may simulate and trigger the "tapping" operation at the location of coordinates (100,100) for one time.

Step S402: The terminal device sends the first operation instruction to the service device; and the service device receives the first operation instruction sent by the terminal device.

Specifically, the terminal device sends, through the Client and through the communications connection established before, the first operation instruction generated based on the first input to the Server of a corresponding IP address and of a corresponding port; when the corresponding Server listens one first operation instruction of the Client, a new thread is obtained and generated to process a request of the Client.

Step S403: The service device responds to the first operation instruction through the first application program, and generates a first response result.

Specifically, because the first application program is installed on the service device, when receiving the operation instruction or the first application program, the service device simulates and re-performs the operation instruction on the first application program that is on the service device. For example, if the operation instruction is a swiping operation, after receiving the swiping operation, the service device needs to locally inject the swiping operation to the first application program to perform the swiping operation, and a response result is obtained. For example, if the first operation instruction is a swiping instruction, the response result is presenting the next page, loading new content, answering a call, or the like. If the first operation instruction is a tapping instruction, the response result is loading and displaying confirmation search content, displaying submission confirmation result, or the like.

For example, after the terminal device is connected to the service device, the remote control actually is that the first input (a touch event, or the like) of the terminal device can be injected to the service device, and the output of the service device is transmitted back to the terminal device through an interface drawing instruction. To inject an event (touch, key, or the like) from the terminal device to the service device, the service device needs to write access of, for example, an Android input event loop subsystem; and to transmit the display from the service device back to the terminal device, the service device needs to read access of an Android display subsystem. Finally, the remote control of the first application program is implemented, that is, the interface of the first application program (APP) that runs on the service device (a mobile phone) is displayed on the terminal device (another mobile phone client), so that the user completes, by operating the mobile phone client, all functions of the APP installed on a far end mobile phone or on the service server.

It may be understood that, in a process in which the service device responds to the first operation instruction, the service device may need to interact with the application service server. For example, the first input of the user is tap loading or updating the page, after injecting an instruction of performing the tapping on the first application program, the service device actually needs to interact the service server, so that corresponding loading content may be obtained. That is, a final response result may be output after the service device interacts with the service server. For some service devices that do not need to interact with the service server, the final response result is output directly on the service device.

It should be noted that, when types of a specific operation instruction included in the first operation instruction are different, for example, when the first operation instruction includes a data collection instruction of a sensor or a hardware device, or the first operation instruction includes the operation instruction for a particular application, specific implementations about how the service device responds to the first operation instruction through the first application program through may be different. For example, the specific implementations may include the following two implementations.

In a possible implementation, the service device responds to the first operation instruction through the first application program, and obtains a first hardware instruction through analysis; the service device sends the first hardware instruction to the terminal device, and the terminal device receives the first hardware instruction of the service device; the terminal device drives, based on the first hardware instruction, the first hardware device to collect data, obtains a collection result of the first hardware device, and sends the collection result of the first hardware device to the service device, and the service device receives the collection result that is of the first hardware device and that is sent by the terminal device, and generates the first response result based on the collection result of the first hardware device. That is, a part of content in the first response result generated by the service device at this time is collected and obtained by a related hardware device of the terminal device. For example, when the first operation instruction includes functions such as the tapping on the camera performed by the user, the recording button, and the map querying, the service device obtains the related hardware instruction through analysis after responding to the first operation instruction. The related hardware instruction corresponds to an instruction instructing the terminal device to drive the camera to take a photo, a voice recording instruction, a map positioning instruction, or the like. After receiving the related hardware instruction, the terminal device drives related hardware to collect data, correspondingly, the terminal device drives a local camera to collect image shooting data, drives a microphone to collect voice data, drives a local map application to collect geographic location data, and returns the collected data to the service device, so that the service device generates a final first response result based on the collection result of the hardware device. Therefore, a part or all of content in the first response result returned by the service device is generated based on a hardware collection result fed back by the terminal device, that is, data is collected by using local hardware of the terminal device or a sensor device, to satisfy a real-time performance of the remote control in a scenario in which data exchanges frequently, thereby improving the quality and efficiency of the remote control.

In another possible implementation, the first interface drawing instruction is used to instruct the terminal device to draw a partial interface corresponding to the first response result, and the partial interface corresponding to the first response result excludes a user interface of a second application program; the service device invokes, based on the first operation instruction, a second application program by using the first application program, and generates the first response result; the service device sends a first control instruction to the terminal device, and the terminal device receives the first control instruction sent by the service device; and the terminal device invokes a local third application program based on the first control instruction, and the third application program is an application program pre-matching the second application program. In this embodiment of the present invention, the third application may be a local application on the terminal device, and the second application may be a local application that is on the service device and that has the same function as the third application. For example, the third application program is a local input method, a local calculator, local call software, a local dial keyboard, or the like, that is, a local application in which operations are performed frequently, or when the operations are performed, the exchange operation frequency is relatively high. When the first response result includes an action of invoking the second application, the first interface drawing instruction excludes a drawing instruction about the second application, and alternatively, by means of additionally sending a control instruction, the terminal device is instructed to locally invoke the third application having the same function as the second application for displaying, so that overheads of frequent transmission between networks are saved.

Further optionally, the terminal device sends a second operation instruction to the service device; and the service device receives the second operation instruction sent by the terminal device. The service device responds to the second operation instruction through the second application program invoked by the first application program, and generates a second response result. The service device extracts a second interface drawing instruction from the second response result and sends the second interface drawing instruction to the terminal device; and the terminal device receives the second interface drawing instruction sent by the service device. The terminal device draws, based on the second interface drawing instruction, a partial interface corresponding to the second response result, where the partial interface excludes the user interface of the second application program. The second operation instruction is generated by the terminal device based on a second input, and the second input is an input acting on a user interface of the third application program. After the third application is invoked on the terminal device and the operation acted by the user on the third application is received, the instruction corresponding to the operation is sent to the service device, the operation is responded to through the second application on the service device, so that the response result is output. Finally, the response result is returned to the terminal device in an interface drawing instruction manner, and the interface drawing instruction still does not need to include the user interface of the second application.

Figure 6:
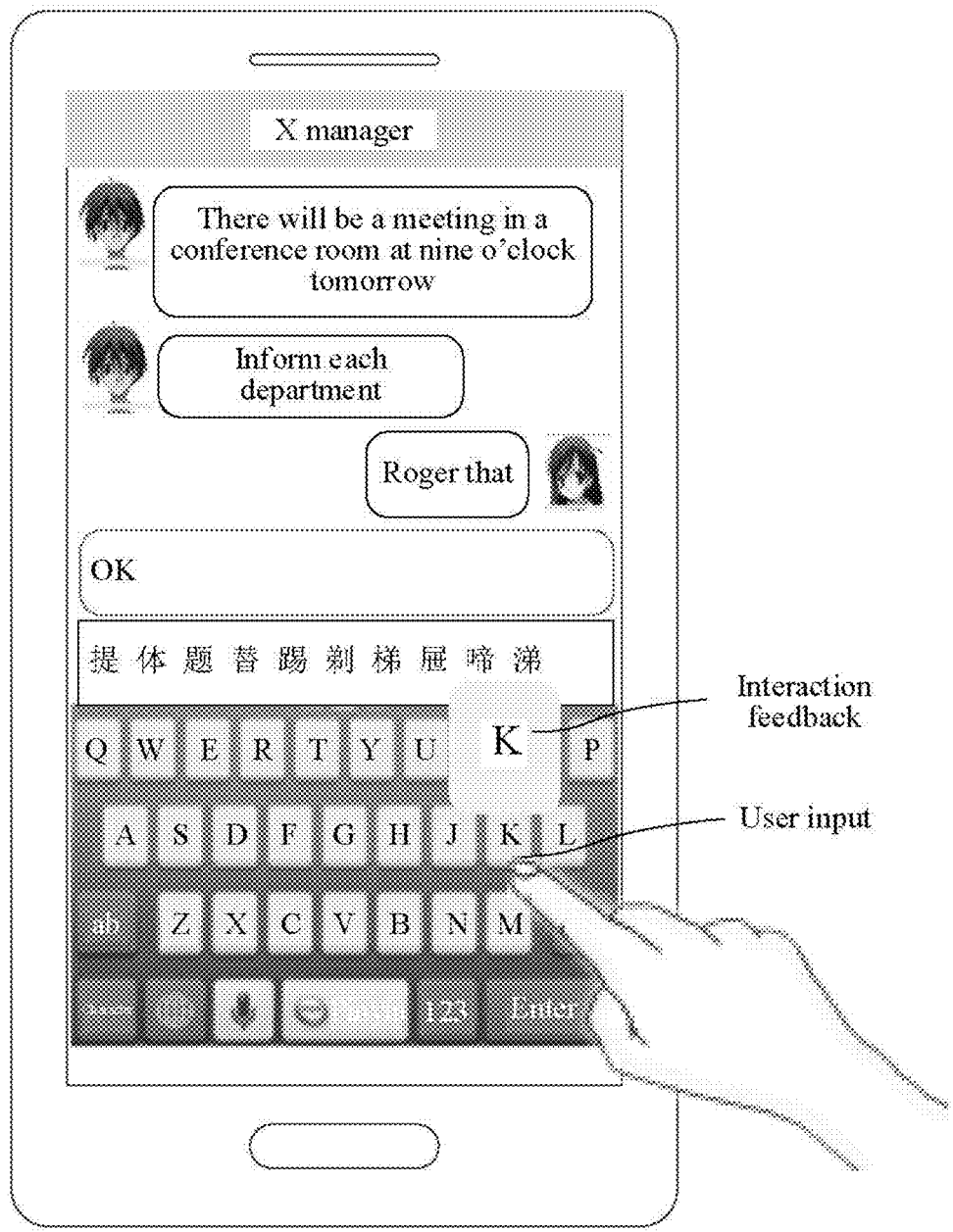
FIG. 6 is a schematic diagram of a remote response of an input method according to an embodiment of the present invention.

For example, the first input acting on the terminal device by the user may have some dynamical interaction feedbacks, and if interface instructions are extracted and drawn in real time for the interaction feedbacks, problems such as low synchronization efficiency, large network bandwidth consumption, and the like may be caused. In addition, the interaction feedbacks are used to make the response process more vivid and personalized, and usually are not a final response result. For example, FIG. 6 is a schematic diagram of a remote response of an input method according to an embodiment of the present invention, in an interaction process of the input method, when a character is tapped, the character may remind the user of the current tapped character in an amplification form, or in an augmented reality manner nearby, then the amplified character icon may be regarded as a second feedback.

The following describes a specific process of starting, hiding, and displaying content of the input method in the APP remote control method in this application by using examples.

The input method is an application having a relatively high knocking frequency of the user, if the input method of a Server end is used, network transmission of the instruction is involved when knocking on the keyboard each time, and the fluency may be affected. Therefore, a solution of the local input method is used, when the client performs an input, the input method of a client mobile phone is invoked to perform the input, thereby improving an input speed, and optimizing user operation experience.

(1) A Local Input Method Starting Procedure

Figure 7:
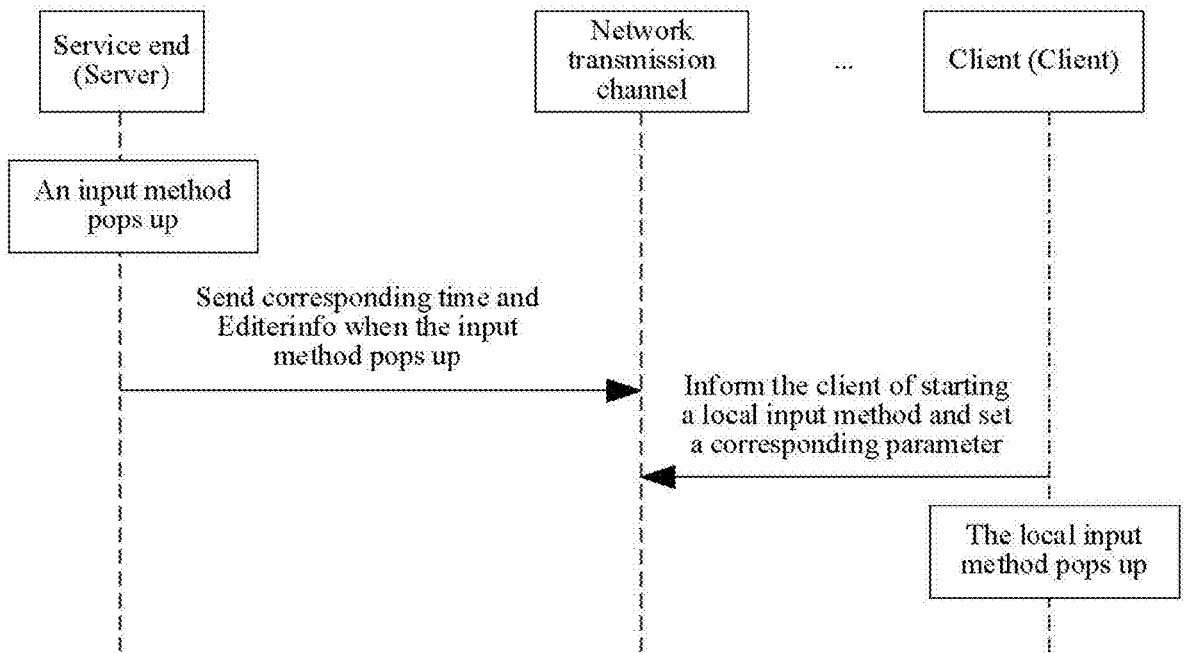
FIG. 7 is a schematic flowchart of starting a local input method according to an embodiment of the present invention.

When the input method of the Server end pops up, the input method sends a pop-up message to the client, the message is user-defined, and carries editor information (EditorInfo). After receiving the information, the client starts the local input method, and sets the EditorInfo sent by the Server end. FIG. 7 s a schematic flowchart of a specific process of starting a local input method according to an embodiment of the present invention.

(2) A Local Input Disappears

Figure 8:
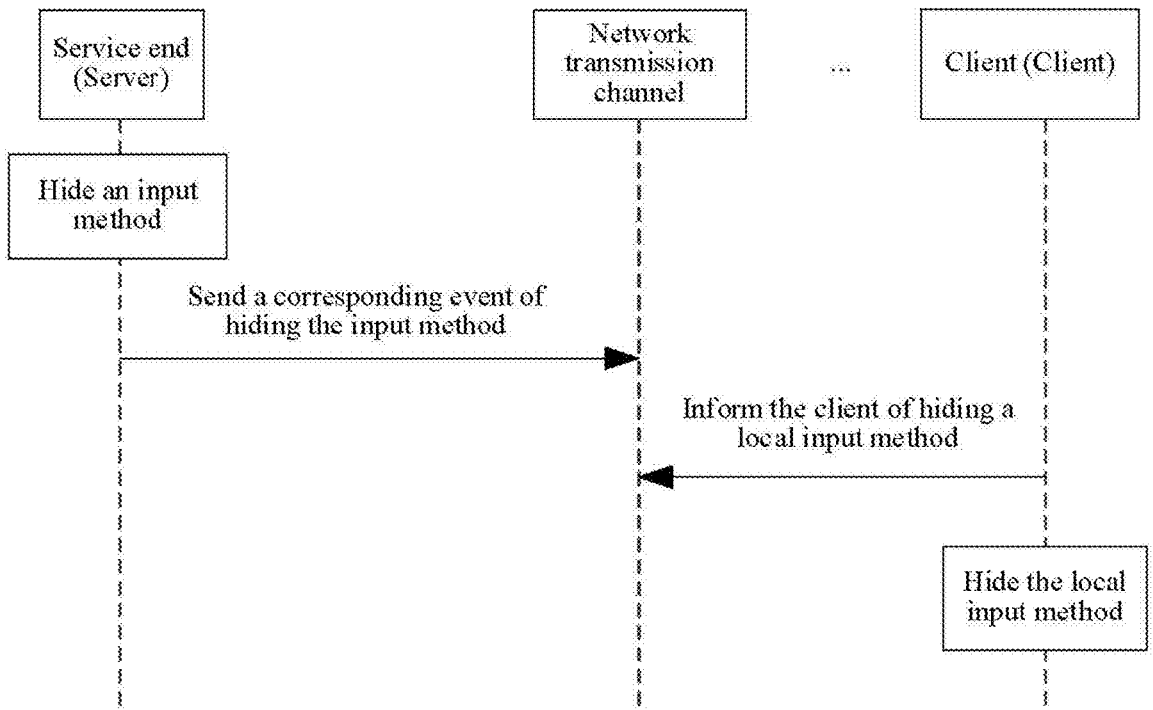
FIG. 8 is a schematic flowchart of hiding a local input method according to an embodiment of the present invention.

When the input method of the Server end is closed, the input method sends one Hide message to the client, the client hides the local input method after receiving the message. A specific process is shown in FIG. 8, of hiding a local input method according to an embodiment of the present invention.

(3) Implementation of Displaying Input Content by Using the Local Input Method

Figure 9:
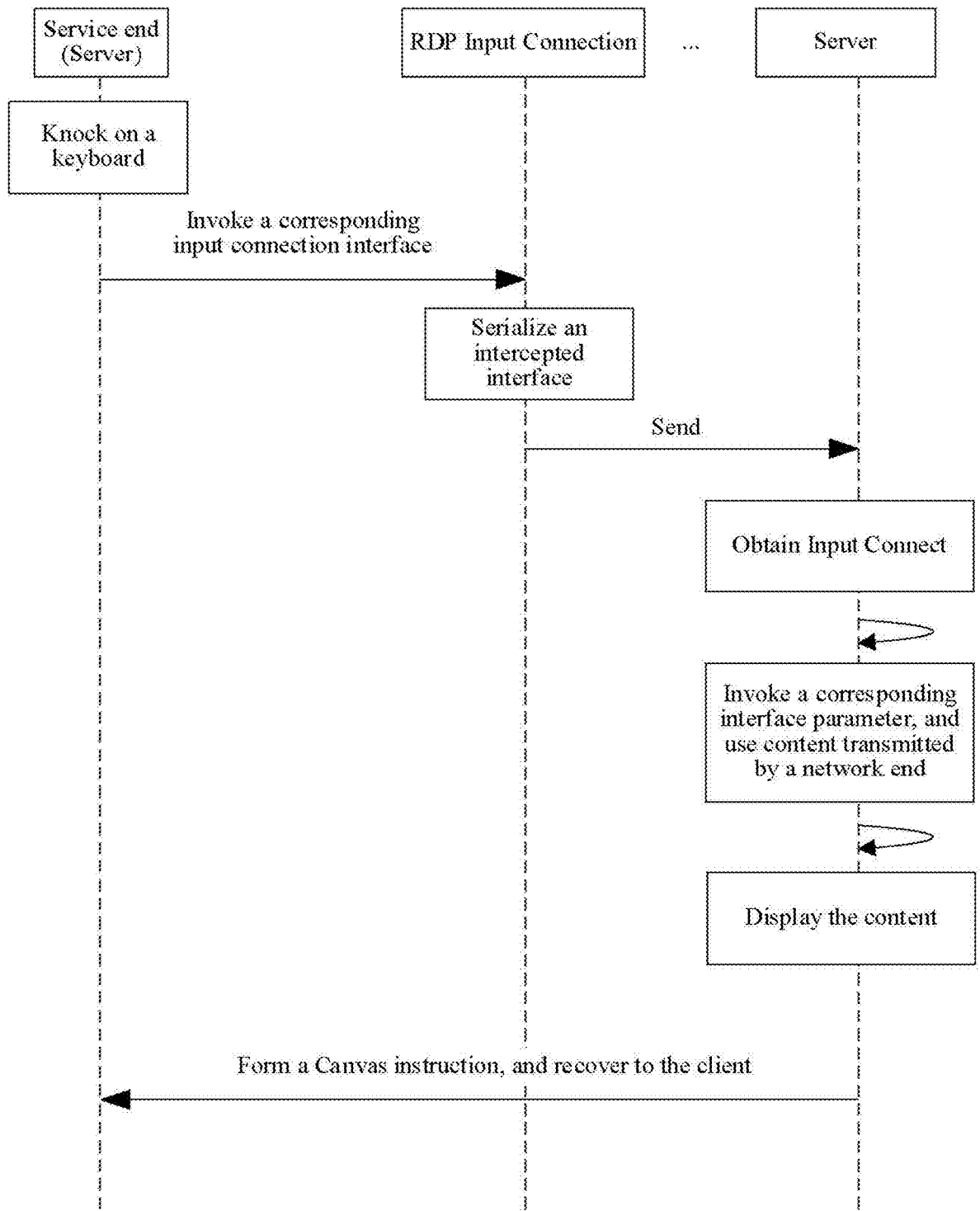
FIG. 9 is a schematic diagram of displaying content by using a local input method according to an embodiment of the present invention.

After the local input method is popped up, the user may knock on the input method keyboard to input a text, from knocking on the keyboard locally to displaying the text, the user-defined Input Connection is implemented herein, and also referred to as an RDP Input Connection. The user-defined Input Connection is a packet of interfaces, and is a communication channel between the application program that receives the input and the Input Method. The RDP Input Connection implements the packet of interfaces, and is used to intercept communication information between the application program and an input method program. Then the information is serialized and transmitted to the Server end, after receiving the information, the Server end then invokes the local Input Connection, and invokes an interface of the local Input Connection, so that the Server end may display content after the Client end knocks on the keyboard, then the content is recovered to the Client end through the Canvas instruction. A specific process is shown in FIG. 9, of displaying content by using a local input method according to an embodiment of the present invention.

It should be noted that, if a variation of the response result generated by the service device is relatively small in the continuous time, for example, only the button changes on the same interface, the service device may extract the interface instruction for changed content in the response result, unchanged content in the response result is not extracted repeatedly. Correspondingly, a terminal device side only needs to re-performing the drawing based on the interface drawing instruction corresponding to the changed content, and other unchanged parts may use the interface drawn last time. Thereby the bandwidth consumption is reduced, and the fluency of remotely displaying the interface is improved.

Step S404: The service device extracts the first interface drawing instruction from the first response result and sends the first interface drawing instruction to the terminal device; and the terminal device receives the first interface drawing instruction sent by the service device.

Specifically, the first interface drawing instruction is used for the terminal device to draw a partial or complete interface corresponding to the first response result. When all of the first response result may be drawn through the interface, the first interface drawing instruction is used for the terminal device to draw the complete interface of the first response result, and when some of first response result are interfaces, and others are other data (such as sensor data, hardware data, and the like), the first interface drawing instruction is used for the terminal device to draw the partial interface of the first response result, and other parts in the first response result are recovered based on other types of instruction. In a complete Android system, the response result completely includes the interface drawing instruction used to display the interface, a sensor instruction at a sensor layer, and the like. The sensor instruction may include the sensor extracted by a hardware abstraction layer HAL and an API invocation instruction of another device. An objective of the service device to extract the first interface drawing instruction from the response result is that, for the terminal device, because the first application program is not installed actually on the terminal device, after receiving the operation instruction of the user, the terminal device essentially cannot process the operation instruction, and the terminal device only can send the first operation instruction to the service device that actually installs the first application program, so that on the service device, the first operation instruction of the user is re-operated on the first application program that is installed on the service device and that is on the Android operating system, and the response result is obtained. An objective of the service device to output the response result is not to display on the service device, but to finally display on the terminal device. Therefore, after the service device outputs the response result, the first interface drawing instruction corresponding to the response result may be extracted, and sent to the terminal device, so that the terminal device may finally recover the response result on the interface.

In a possible implementation, the foregoing first interface drawing instruction and/or second interface drawing instruction include/includes the Canvas instruction at the View layer of the Android operating system and the OpenGL instruction at the Libraries layer of the Android operating system.

Figure 5:
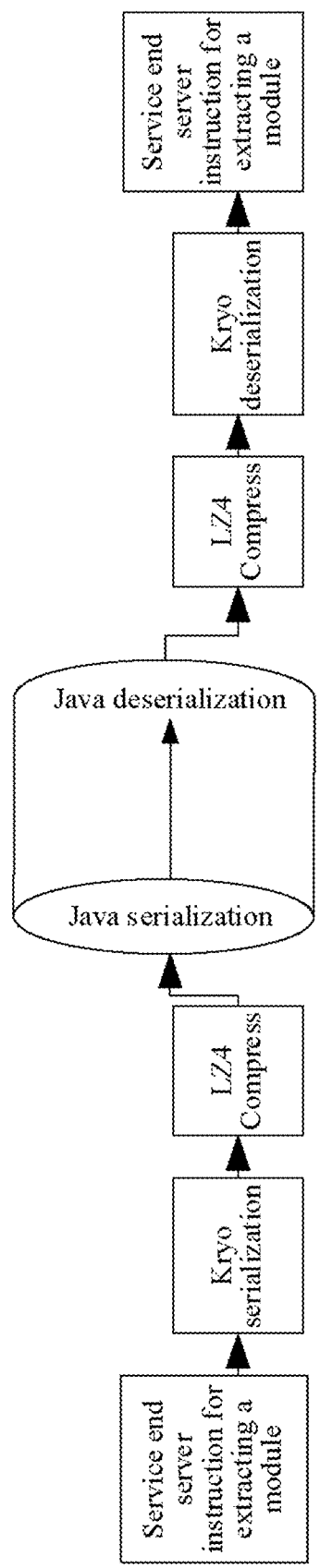
FIG. 5 is a schematic diagram of transmitting an interface drawing instruction according to an embodiment of the present invention.

In a possible implementation, that the service device extracts the first interface drawing instruction from the response result, and sends the first interface drawing instruction to the terminal device specifically includes: extracting, by the service device, the first interface drawing instruction from the response result, generating sequence information of the first interface drawing instruction by using a preset serialization algorithm, then generating compression information of the sequence information by using a preset compression algorithm, and finally sending the compressed and serialized interface drawing instruction to the terminal device. Considering of the complexity of a data structure of the first interface drawing instruction when this embodiment of the present invention involves in Client/Server data communication, in transmission between the terminal device and the service device, message transferring is performed in a serialization manner, and data of the first interface drawing instruction is compressed to further reduce the bandwidth consumption. That is, the first interface drawing instruction is encoded, compressed, and then sent to the terminal device, after receiving the encoded and compressed interface drawing instruction, the terminal device first needs to perform the decompression, then perform the deserialization, and finally obtain the interface drawing instruction. The subsequent second interface drawing instruction and third interface drawing instruction may further be serialized and compressed similarly. Details are not described in the following. FIG. 5 is a schematic diagram of transmitting an interface drawing instruction according to an embodiment of the present invention, the service device first serializes the first interface drawing instruction through the serialization algorithm, then performs the compression through the compression algorithm, and finally performs transmission through the communication linkage established between the terminal device and the service device; and terminal device side first performs the decompression through the same decompression algorithm, and finally performs the deserialization by using the serialization algorithm, thereby recovering the first interface drawing instruction. Optionally, the serialization algorithm may use ProtocolBuf, and the compression algorithm may use LZ4.

In a possible implementation, a response result generated by the service device includes a first image resource, and the first image resource is an image resource greater than a preset threshold; when the first image resource is buffered on the terminal device, the interface drawing instruction extracted by the service device from the response result includes a first identifier, and the first identifier is used to instruct the terminal device to display the first image resource based on a buffer of the first image resource; and when the first image resource is not buffered on the terminal device, the interface drawing instruction extracted by the service device from the response result includes an image drawing instruction of the first image resource. That is, in the process of extracting the first interface drawing instruction, when the response result involves a relatively large first image resource, for example, a picture, a video, or a flash, to reduce the bandwidth consumption caused by repeated transmission of the first image resource, and simultaneously improve the fluency of displaying an image resource, the terminal device needs to locally buffer the first image resource after receiving the first image resource in the first time, when it needs to be viewed or operated next time, the service device does not need to extract the interface drawing instruction for the first image resource again, and only needs to first determine whether the terminal device draws and buffer the first image resource. If the first image resource is buffered, it only needs to send an identifier of the first image resource to the terminal device, so that the terminal device can directly load locally, and if the first image resource is not buffered, it needs to send an image drawing instruction of a corresponding first image resource to the terminal device for drawing.

Optionally, a buffer manner of the foregoing first image resource may be an asynchronous buffer manner. Specifically, the terminal device has two different threads: a drawing thread performing the drawing instruction and a picture synchronous thread performing a synchronization of the picture resource, and the two threads run independently, and do not interfere each other. A process of compressing and transmitting the picture resource is performed in an independent thread, thereby avoiding impact on execution of the drawing thread, and improving the fluency of interface drawing. When needing to draw a picture, the client device may first check whether the picture is stored locally, if the image is stored locally, the picture is directly drawn in the drawing thread; and if the picture is not stored locally, an operation of synchronizing the picture may be initiated in the synchronous thread. When the picture synchronous operation is performed, the drawing thread continues to perform other drawing instructions, and when the picture synchronous operation is complete, a GUI interface is triggered to be refreshed, so that the drawing thread redraws the picture. It may be understood that, the subsequent second response result, second interface drawing instruction and third interface drawing instruction may also use the foregoing manner. Details are not described in the following.

Step S405: The terminal device draws, based on the first interface drawing instruction, a partial or complete interface corresponding to the first response result.

Specifically, the terminal device draws, based on the first interface drawing instruction, the interface corresponding to the response result. Although the operating system on the terminal device may be different from the operating system on the service device, for example, the operating system on the terminal device is IOS. However, most of operating systems support the same Android graphics drawing (Skia) instruction set. Therefore, the drawing instruction that is extracted by this embodiment of the present invention on the operating system of the service device and that meets the Skia standard may be recovered on another operating system that also supports the Skia instruction set. Therefore, after receiving the interface drawing instruction, the terminal device may redraw the response result through an interface drawing object or an interface drawing element of the terminal device.

Optionally, this application may further include step S406 to step S409.

Step S406: The service device receives a first message sent by the service server, the first message is a receiving message of the first application program.

Step S407: The service device responds to the first message through the first application program, and generates a third response result.

Step S408: The service device extracts a third interface drawing instruction from the third response result and sends the third interface drawing instruction to the terminal device; and the terminal device receives the third interface drawing instruction sent by the service device.

Step S409: The terminal device draws, based on the third interface drawing instruction, a partial or complete interface corresponding to the third response result.

In the foregoing step S406 to step S409, when the receiving message comes from the service server, that is, in this case, there is no operation instruction of the terminal device, the terminal device needs to reactively receive message content that comes from the service server. In this case, the terminal device does not need to send the operation instruction to the service device, and alternatively, the service device receives the message content sent by the service server, and then actively sends the updated message content to the terminal device, the Client on the terminal device only needs to update the visualized interface. For related processing methods of the second response result and the second interface drawing instruction, refer to related descriptions of the foregoing first response result and the first interface drawing instruction. Details are not described herein again.

Optionally, the service device also extracts a second hardware instruction from the third response result, and sends the second hardware instruction to the terminal device; the terminal device receives the second hardware instruction sent by the service device; and the terminal device drives, based on the second hardware instruction, a second hardware device to perform an output. The message reactively received by the terminal device side may also include a hardware output message. Therefore, besides needing to send the interface drawing instruction, the service device also needs to send the hardware instruction, to drive a corresponding hardware device on the terminal device to perform a hardware data output. Specifically, driving the second hardware device to perform the output may be driving a speaker to play, driving a camera flash to light, driving a vibration device to vibrate, or the like. For example, when a chat window receives an image with voice, in this case, not only the interface drawing instruction is needed, but also the speaker on the terminal device needs to be driven to play related voice information.

In this embodiment of the present invention, in the APP remote control, an APP already installed on a service device side is used to respond to an operation instruction that is on the terminal device and that is for the APP, so that a response result is obtained on the service device. By means of extracting an interface drawing instruction (not a video stream) from the response result, the interface drawing instruction corresponding to the response result is sent to the terminal device, so that the terminal device locally draws and generates, based on the interface drawing instruction, an interface corresponding to the response result. Therefore, a manner of implementing the remote control through the video stream is avoided, transmission bandwidth is reduced, and efficiency and fluency that are of the APP remote control are improved.

The method in embodiments of the present invention is described above in detail, and a related apparatus in the embodiments of the present invention is provided below.

Figure 10:
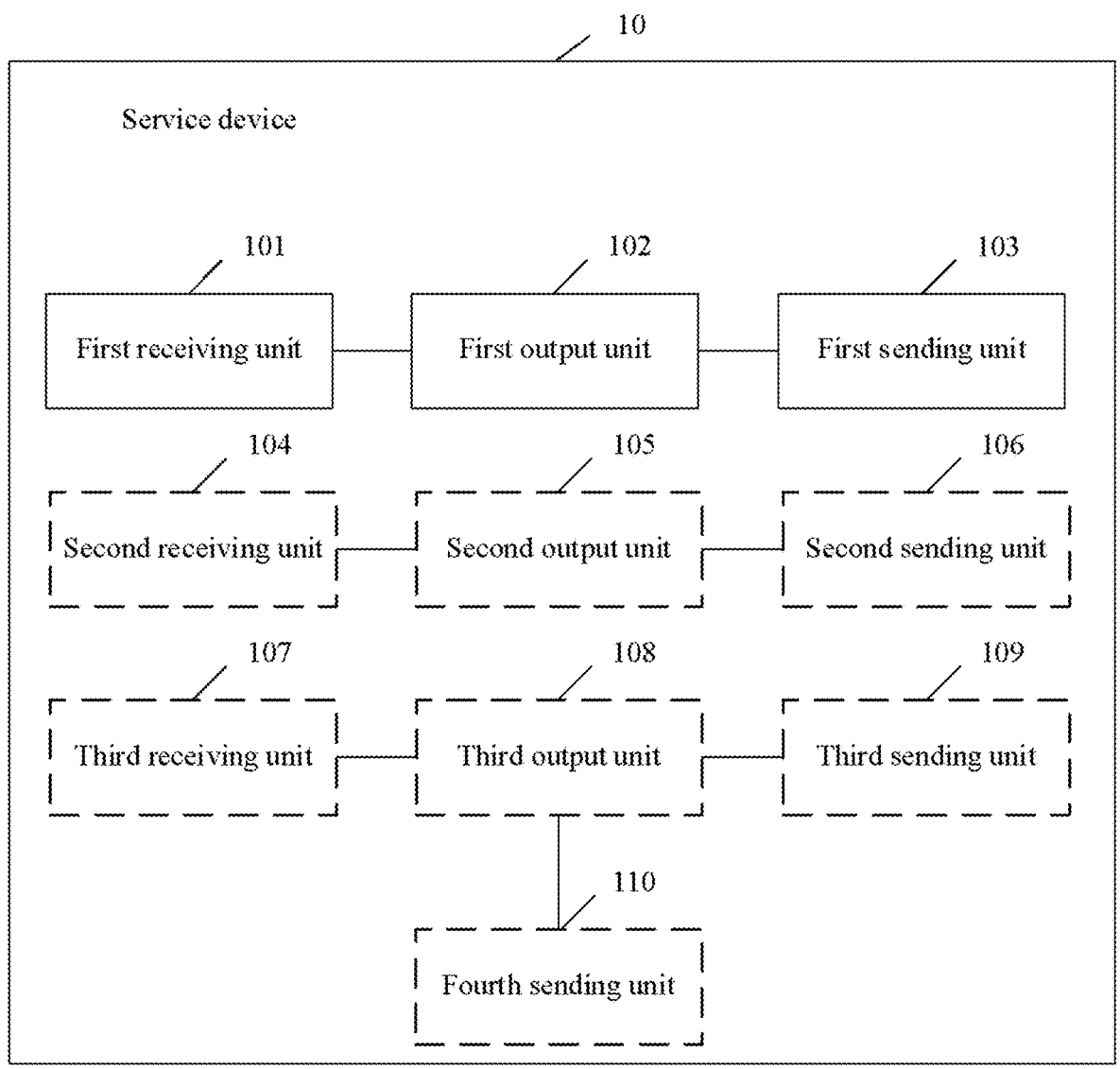
FIG. 10 is a schematic structural diagram of a service device according to an embodiment of the present invention.

FIG. 10 is a schematic structural diagram of a service device according to an embodiment of the present invention, the service device 10 may include a first receiving unit 101, a first output unit 102, and a first sending unit 103. The units are described below in detail.

The first receiving unit 101 is configured to receive a first operation instruction sent by a terminal device, where the first operation instruction is generated by the terminal device based on a first input, the first input includes an input acting on a start of an application icon of a first application program, and/or an input acting on a user interface of the first application program, the first application program runs on the service device, and the application icon of the first application program and the user interface of the first application program are displayed on the terminal device.

The first output unit 102 is configured to respond to the first operation instruction through the first application program, and generate a first response result.

The first sending unit 103 is configured to extract a first interface drawing instruction from the first response result, and send the first interface drawing instruction to the terminal device, where the first interface drawing instruction is used for the terminal device to draw a partial or complete interface corresponding to the first response result.

In a possible implementation, the first output unit 102 is specifically configured to:

respond to the first operation instruction through the first application program, and obtain a first hardware instruction through analysis; send the first hardware instruction to the terminal device, where the first hardware instruction is used to instruct the terminal device to drive the first hardware device to collect data; receive a collection result that is of the first hardware device and that is sent by the terminal device; and generate the first response result based on the collection result of the first hardware device.

In a possible implementation, the first output unit 102 is specifically configured to:

invoke, based on the first operation instruction, a second application program by using the first application program, and generate the first response result; where the first interface drawing instruction is used for the terminal device to draw the partial interface corresponding to the first response result, and the partial interface corresponding to the first response result excludes a user interface of the second application program; and the service device further includes:

a first control unit, configured to send a first control instruction to the terminal device, where the first control instruction is used to instruct the terminal device to invoke a local third application program, and the third application program is an application program pre-matching the second application program.

In a possible implementation, the service device 10 further includes:

a second receiving unit 104, configured to receive a second operation instruction sent by the terminal device, where the second operation instruction is generated by the terminal device based on a second input, and the second input is an input acting on a user interface of the third application program;

a second output unit 105, configured to: respond to the second operation instruction through the second application program invoked by the first application program, and generate a second response result; and a second sending unit 106, configured to: extract a second interface drawing instruction from the second response result, and send the second interface drawing instruction to the terminal device, where the second interface drawing instruction is used for the terminal device to draw a partial interface corresponding to the second response result, and the partial interface corresponding to the second response result excludes the user interface of the second application program.

In a possible implementation, the service device 10 further includes:

a third receiving unit 107, configured to receive a first message sent by a service server, where the first message is a receiving message of the first application program;

a third output unit 108, configured to: respond to the first message through the first application program, and generate a third response result; and a third sending unit 109, configured to: extract a third interface drawing instruction from the third response result, and send the third interface drawing instruction to the terminal device, where the third interface drawing instruction is used for the terminal device to draw a partial or complete interface corresponding to the third response result.

In a possible implementation, the service device 10 further includes:

a fourth sending unit 110, configured to: extract a second hardware instruction from the third response result, and send the second hardware instruction to the terminal device, where the second hardware instruction is used to instruct the terminal device to drive, based on the second hardware instruction, a second hardware device to perform an output.

In a possible implementation, the interface drawing instruction sent by the service device to the terminal device is subject to serialization and compression processing.

In a possible implementation, the response result generated by the service device includes a first image resource, and the first image resource is an image resource greater than a preset threshold;

when the first image resource is buffered on the terminal device, the interface drawing instruction extracted by the service device from the response result includes a first identifier, and the first identifier is used to instruct the terminal device to display the first image resource based on a buffer of the first image resource; and when the first image resource is not buffered on the terminal device, the interface drawing instruction extracted by the service device from the response result includes an image drawing instruction of the first image resource.

In a possible implementation, the interface drawing instruction extracted by the service device from the generated response result includes a Canvas instruction at a View layer of an Android operating system and an OpenGL instruction at a Libraries layer of the Android operating system.

It should be noted that, for functions of functional units in the service device 10 described in this embodiment of the present invention, refer to related descriptions of step S401 to step S409 in the method embodiment in the foregoing FIG. 4. Details are not described herein again.

Figure 11:
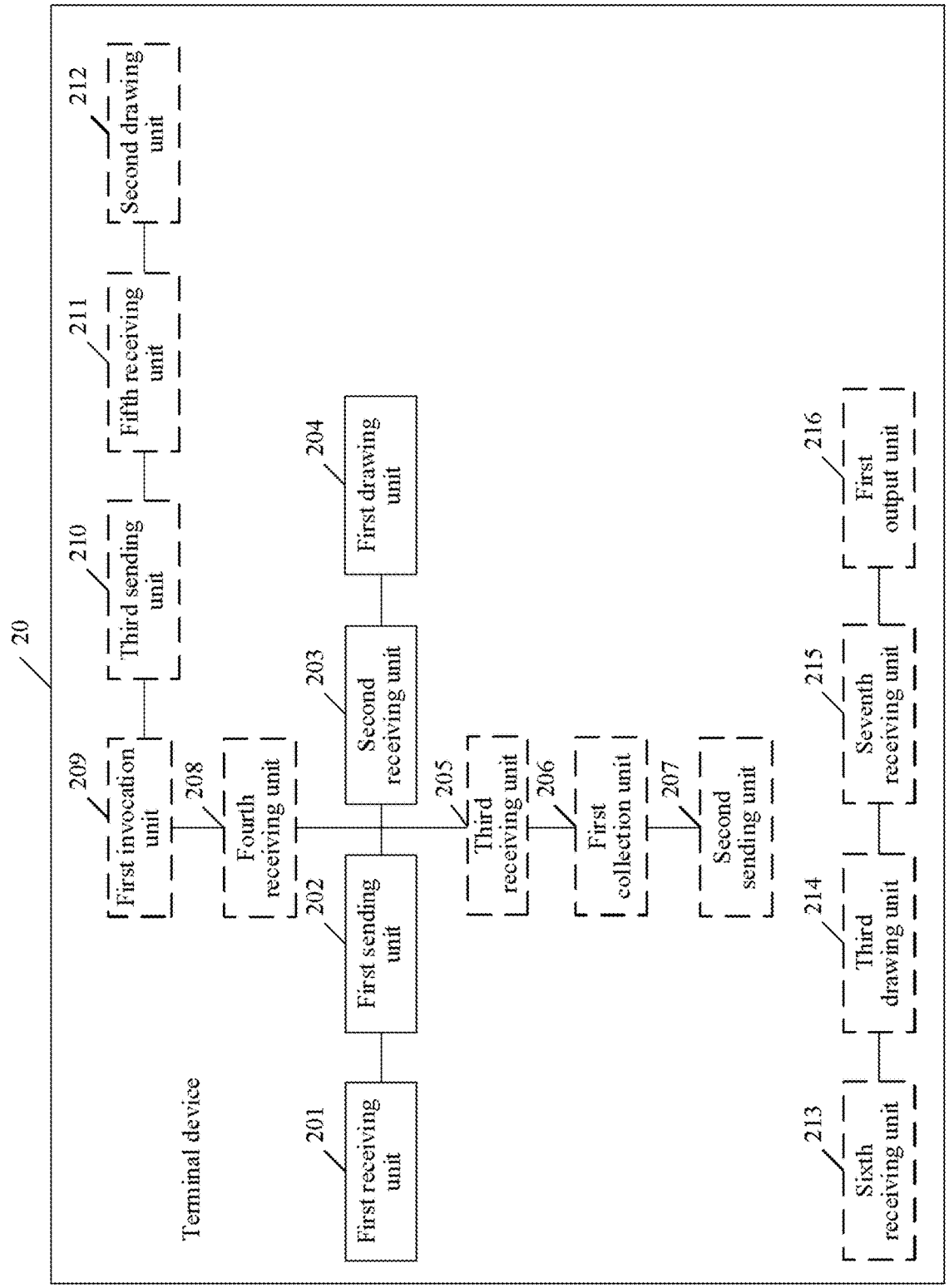
FIG. 11 is a schematic structural diagram of a terminal device according to an embodiment of the present invention.

FIG. 11 is a schematic structural diagram of a terminal device according to an embodiment of the present invention, wherein the terminal device 20 may include a first receiving unit 201, a first sending unit 202, a second receiving unit 203, and a first drawing unit 204. The units are described below in detail.

The first receiving unit 201 is configured to receive a first input, and generate a first operation instruction based on the first input, where the first input includes an input acting on a start of an application icon of a first application program, and/or an input acting on a user interface of the first application program, the first application program runs on the service device, and the application icon of the first application program and the user interface of the first application program are displayed on the terminal device.

The first sending unit 202 is configured to send the first operation instruction to the service device, where the first operation instruction is used for the service device to respond to the first operation instruction through the first application program and generate a first response result.

The second receiving unit 203 is configured to receive a first interface drawing instruction sent by the service device, where the first interface drawing instruction is extracted by the service device from the first response result.

The first drawing unit 204 is configured to draw, based on the first interface drawing instruction, a partial or complete interface corresponding to the first response result.

In a possible implementation, the terminal device 20 further includes:

a third receiving unit 205, configured to receive a first hardware instruction of the service device, where the first hardware instruction is a hardware instruction obtained through analysis after the service device responds to the first operation instruction through the first application program;

a first collection unit 206, configured to: drive, based on the first hardware instruction, a first hardware device to collect data, and obtain a collection result of the first hardware device; and a second sending unit 207, configured to send the collection result of the first hardware device to the service device.

In a possible implementation, the first response result is a response result generated by the service device based on the first operation instruction, by invoking a second application program by using the first application program; and the first interface drawing instruction is used for the terminal device to draw the partial interface corresponding to the first response result, and the partial interface corresponding to the first response result excludes a user interface of the second application program; and the terminal device further includes:

a fourth receiving unit 208, configured to receive a first control instruction sent by the service device; and a first invocation unit 209, configured to invoke a local third application program based on the first control instruction, where the third application program is an application program pre-matching the second application program.

In a possible implementation, the terminal device 20 further includes:

a third sending unit 210, configured to send a second operation instruction to the service device, where the second operation instruction is generated by the terminal device based on a second input, and the second input is an input acting on a user interface of the third application program;

a fifth receiving unit 211, configured to receive a second interface drawing instruction sent by the service device, where the second interface drawing instruction is extracted by the service device from a second response result, and the second response result is a response result generated after the service device responds to the second operation instruction through the second application program invoked by the first application program; and a second drawing unit 212, configured to draw, based on the second interface drawing instruction, a partial interface corresponding to the second response result, where the partial interface excludes the user interface of the second application program.

In a possible implementation, the terminal device 20 further includes:

a sixth receiving unit 213, configured to receive a third interface drawing instruction sent by the service device, where the third interface drawing instruction is extracted by the service device from a third response result, the third response result is output after the service device responds to a first message through the first application program, and the first message is a receiving message of the first application program; and a third drawing unit 214, configured to draw, based on the third interface drawing instruction, a partial or complete interface corresponding to the third response result.

In a possible implementation, the terminal device 20 further includes:

a seventh receiving unit 215, configured to receive a second hardware instruction sent by the service device, where the second hardware instruction is extracted by the service device from the third response result; and a first output unit 216, configured to drive, based on the second hardware instruction, a second hardware device to perform an output.

In a possible implementation, the response result generated by the service device includes a first image resource, and the first image resource is an image resource greater than a preset threshold;

when the first image resource is buffered on the terminal device, the interface drawing instruction extracted by the service device from the response result includes a first identifier, and the first identifier is used to instruct the terminal device to display the first image resource based on a buffer of the first image resource; and when the first image resource is not buffered on the terminal device, the interface drawing instruction extracted by the service device from the response result includes an image drawing instruction of the first image resource.

In a possible implementation, the interface drawing instruction extracted by the service device from the generated response result includes a Canvas instruction at a View layer of an Android operating system and an OpenGL instruction at a Libraries layer of the Android operating system.

It should be noted that, for functions of functional units in the terminal device 20 described in this embodiment of the present invention, refer to related descriptions of step S401 to step S409 in the method embodiment in the foregoing FIG. 4. Details are not described herein again.

Figure 12:
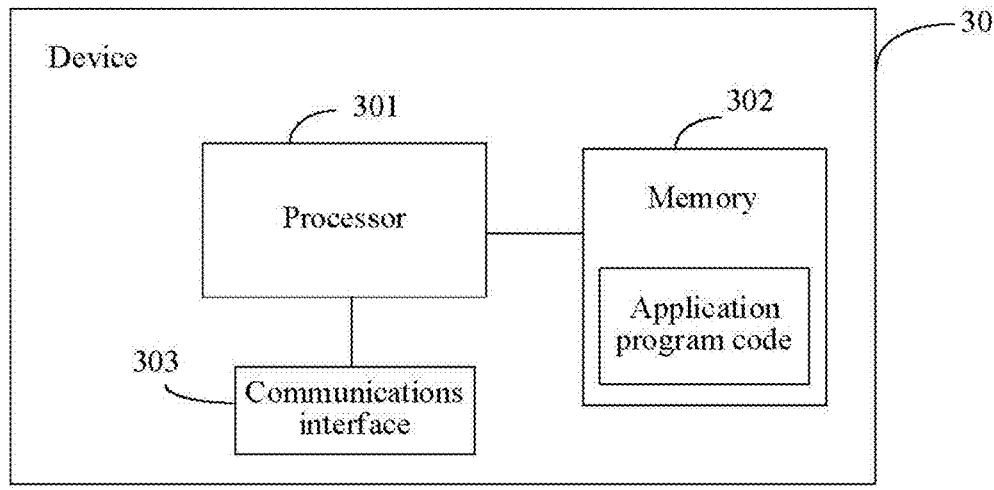
FIG. 12 is a schematic structural diagram of a device according to an embodiment of the present invention.

As shown in FIG. 12, FIG. 12 is a schematic structural diagram of a device according to an embodiment of the present invention. Both the service device and the terminal device may be implemented by using a structure in FIG. 12, wherein the device 30 includes at least one processor 301, at least one memory 302, and at least one communications interface 303. In addition, the device may further include universal components such as an antenna. Details are not described herein again.

The processor 301 may be a general purpose central processing unit (CPU), a microprocessor, an application-specific integrated circuit (ASIC), or one or more integrated circuits configured to control program execution in the foregoing solution.

The communications interface 303 is configured to communicate with another device or a communications network such as the Ethernet, a radio access network (RAN), or a wireless local area network (WLAN).

The memory 302 may be a read-only memory (ROM) or another type of static storage device that can store static information and a static instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), or a magnetic disk storage medium, another magnetic storage device, or any other medium that can be configured to carry or store expected program code in a form of an instruction or a data structure and that can be accessed by a computer. This is not limited herein. The memory may exist independently, or connected to the processor by using the bus. Alternatively, the storage may be integrated with the processor.

The memory 302 is configured to store application program code for executing the foregoing solution, and the execution is controlled by the processor 301. The processor 301 is configured to execute the application program code stored in the memory 302.

When the device shown in FIG. 12 is the service device in this application, code stored by the memory 302 may perform the APP remote control method provided above, for example, the service device receives a first operation instruction sent by a terminal device, where the first operation instruction is generated by the terminal device based on a first input, the first input includes an input acting on a start of an application icon of a first application program, and/or an input acting on a user interface of the first application program, the first application program runs on the service device, and the application icon of the first application program and the user interface of the first application program are displayed on the terminal device; responds to the first operation instruction through the first application program, and generates a first response result; and extracts a first interface drawing instruction from the first response result, and sends the first interface drawing instruction to the terminal device, where the first interface drawing instruction is used for the terminal device to draw a partial or complete interface corresponding to the first response result.

When the device shown in FIG. 12 is the terminal device in this application, code stored in the memory 302 may perform the APP remote control method provided above, for example, the terminal device receives a first input, and generates a first operation instruction based on the first input, where the first input includes an input acting on a start of an application icon of a first application program, and/or an input acting on a user interface of the first application program, the first application program runs on the service device, and the application icon of the first application program and the user interface of the first application program are displayed on the terminal device; sends the first operation instruction to the service device, where the first operation instruction is used for the service device to respond to the first operation instruction through the first application program and generate a first response result; receives a first interface drawing instruction sent by the service device, where the first interface drawing instruction is extracted by the service device from the first response result; and draws, based on the first interface drawing instruction, a partial or complete interface corresponding to the first response result.

It should be noted that, for functions of functional units in the service device and the terminal device described in this embodiment of the present invention, refer to related descriptions of the method embodiment in the foregoing FIG. 4. Details are not described herein again.

Figure 13:
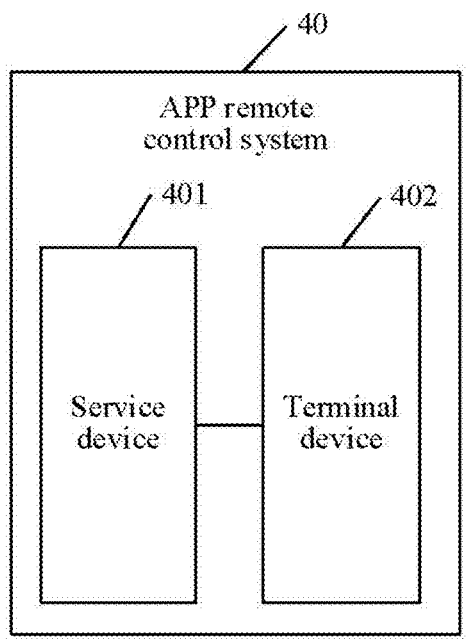
FIG. 13 is a schematic structural diagram of an APP remote control system according to an embodiment of the present invention.

FIG. 13 is a schematic structural diagram of an APP remote control system according to an embodiment of the present invention, and the system 40 includes a service device 401 and a terminal device 402.

For structures of the service device 401 and the terminal device 402, correspondingly refer to the device 30 shown in FIG. 12. It can be understood that the system 40 in this embodiment of the present invention may further include a switch, a route device, and the like that provide related services. For functions of the service device 401 and the terminal device 402 that are in the system 40, correspondingly refer to specific implementations of the method embodiment in the foregoing FIG. 4. Details are not described herein again.

Embodiments of the present invention further provide a computer program, the computer program includes an instruction, and when the computer program is executed by a computer, the computer is enabled to perform some or all of steps of any APP remote control method.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to exemplary embodiments, and the involved actions and modules are not necessarily required by this application.

In the several embodiments provided in this application, it should be understood that the disclosed apparatus may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:
receiving, by a service device, a first operation instruction sent by a terminal device, wherein the first operation instruction is generated by the terminal device based on a first input, the first input comprises an input acting on a start of an application icon of a first application program, and/or an input acting on a user interface of the first application program, the first application program runs on the service device, and the application icon of the first application program and the user interface of the first application program are displayed on the terminal device;
responding, by the service device, to the first operation instruction through the first application program, and generating a first response result; and
extracting, by the service device, a first interface drawing instruction from the first response result, and sending the first interface drawing instruction to the terminal device, wherein the first interface drawing instruction is used for the terminal device to draw a partial or complete interface corresponding to the first response result, wherein
responding, by the service device, to the first operation instruction through the first application program, and generating the first response result includes:
invoking, by the service device based on the first operation instruction, a second application program by using the first application program, and generating the first response result, wherein the first interface drawing instruction is used for the terminal device to draw the partial interface corresponding to the first response result, and the partial interface corresponding to the first response result does not comprise a user interface of the second application program, and wherein the method further comprises:
sending, by the service device, a first control instruction to the terminal device, wherein the first control instruction is used to instruct the terminal device to invoke a third application program, and the third application program pre-matches the second application program, wherein the third application program is a local application on the terminal device, the second application program is a local application on the service device, and the third application program pre-matches the second application program when the second application program has a same function as the third application program.

2. The method according to claim 1, wherein the responding, by the service device, to the first operation instruction through the first application program, and generating a first response result comprises:
responding, by the service device, to the first operation instruction through the first application program, and obtaining a first hardware instruction through analysis;
sending, by the service device, the first hardware instruction to the terminal device, wherein the first hardware instruction is used to instruct the terminal device to drive a first hardware device to collect data;
receiving, by the service device, a collection result that is of the first hardware device and that is sent by the terminal device; and
generating, by the service device, the first response result based on the collection result of the first hardware device.

3. The method according to claim 1, further comprising:
receiving, by the service device, a second operation instruction sent by the terminal device, wherein the second operation instruction is generated by the terminal device based on a second input, and the second input is an input acting on a user interface of the third application program;
responding, by the service device, to the second operation instruction through the second application program invoked by the first application program, and generating a second response result; and
extracting, by the service device, a second interface drawing instruction from the second response result, and sending the second interface drawing instruction to the terminal device, wherein the second interface drawing instruction is used for the terminal device to draw a partial interface corresponding to the second response result, and the partial interface corresponding to the second response result does not comprise the user interface of the second application program.

4. The method according to claim 1, further comprising:
receiving, by the service device, a first message sent by a service server, wherein the first message is a receiving message of the first application program;
responding, by the service device, to the first message through the first application program, and generating a third response result; and
extracting, by the service device, a third interface drawing instruction from the third response result, and sending the third interface drawing instruction to the terminal device, wherein the third interface drawing instruction is used for the terminal device to draw a partial or complete interface corresponding to the third response result.

5. The method according to claim 4, further comprising:
extracting, by the service device, a second hardware instruction from the third response result, and sending the second hardware instruction to the terminal device, wherein the second hardware instruction is used to instruct the terminal device to drive, based on the second hardware instruction, a second hardware device to perform an output.

6. The method according to claim 1, wherein the interface drawing instruction sent by the service device to the terminal device is subject to serialization and compression processing.

7. The method according to claim 1, wherein the first response result generated by the service device comprises a first image resource, and the first image resource is an image resource greater than a preset threshold;
when the first image resource is buffered on the terminal device, the first interface drawing instruction extracted by the service device from the first response result comprises a first identifier, and the first identifier is used to instruct the terminal device to display the first image resource based on a buffer of the first image resource; and
when the first image resource is not buffered on the terminal device, the first interface drawing instruction extracted by the service device from the first response result comprises an image drawing instruction of the first image resource.

8. The method according to claim 1, wherein the first interface drawing instruction extracted by the service device from the generated response result comprises a Canvas instruction at a View layer of an Android operating system and an OpenGL instruction at a Libraries layer of the Android operating system.

9. The method of claim 1, wherein the service device is configured to extract the first interface drawing instruction for changed content from the first response result, and the terminal device is configured to re-draw the partial or complete interface corresponding to the changed content from the first response result.

10. The method of claim 1, wherein the terminal device includes a remote desktop program client, and the remote desktop program client utilizes the first interface drawing instruction to draw the partial or complete interface corresponding to the first response result.

11. A method, comprising:
receiving, by a terminal device, a first input, and generating a first operation instruction based on the first input, wherein the first input comprises an input acting on a start of an application icon of a first application program, and/or an input acting on a user interface of the first application program, the first application program runs on a service device, and the application icon of the first application program and the user interface of the first application program are displayed on the terminal device;
sending, by the terminal device, the first operation instruction to the service device, wherein the first operation instruction is used for the service device to respond to the first operation instruction through the first application program and generate a first response result;
receiving, by the terminal device, a first interface drawing instruction sent by the service device, wherein the first interface drawing instruction is extracted by the service device from the first response result; and drawing, by the terminal device based on the first interface drawing instruction, a partial or complete interface corresponding to the first response result, wherein the first response result is generated by the service device based on the first operation instruction by invoking a second application program by using the first application program, the first interface drawing instruction is used for the terminal device to draw the partial interface corresponding to the first response result, and the partial interface corresponding to the first response result does not comprise a user interface of the second application program, wherein the method further comprises:

receiving, by the terminal device, a first control instruction sent by the service device; and invoking, by the terminal device, a third application program based on the first control instruction, wherein the third application program pre-matches the second application program, and the third application program is a local application on the terminal device, the second application program is a local application on the service device, and the third application program pre-matches the second application program when the second application program has a same function as the third application program.

12. The method according to claim 11, further comprising:

receiving, by the terminal device, a first hardware instruction of the service device, wherein the first hardware instruction is obtained through analysis after the service device responds to the first operation instruction through the first application program;

driving, by the terminal device based on the first hardware instruction, a first hardware device to collect data, and obtaining a collection result of the first hardware device; and sending, by the terminal device, the collection result of the first hardware device to the service device.

13. The method according to claim 11, further comprising:

sending, by the terminal device, a second operation instruction to the service device, wherein the second operation instruction is generated by the terminal device based on a second input, and the second input is an input acting on a user interface of the third application program;

receiving, by the terminal device, a second interface drawing instruction sent by the service device, wherein the second interface drawing instruction is extracted by the service device from a second response result, and the second response result is a response result generated after the service device responds to the second operation instruction through the second application program invoked by the first application program; and drawing, by the terminal device based on the second interface drawing instruction, a partial interface corresponding to the second response result, wherein the partial interface does not comprise the user interface of the second application program.

14. The method according to claim 11, further comprising:

receiving, by the terminal device, a third interface drawing instruction sent by the service device, wherein the third interface drawing instruction is extracted by the service device from a third response result, the third response result is output after the service device responds to a first message through the first application program, and the first message is a receiving message of the first application program; and drawing, by the terminal device based on the third interface drawing instruction, a partial or complete interface corresponding to the third response result.

15. The method according to claim 14, further comprising:

receiving, by the terminal device, a second hardware instruction sent by the service device, wherein the second hardware instruction is extracted by the service device from the third response result; and driving, by the terminal device based on the second hardware instruction, a second hardware device to perform an output.

16. A service device, comprising:

a processor; and a memory configured to store computer readable instructions that, when executed by the processor, cause the service device to:

receive a first operation instruction sent by a terminal device, wherein the first operation instruction is generated by the terminal device based on a first input, the first input comprises an input acting on a start of an application icon of a first application program, and/or an input acting on a user interface of the first application program, the first application program runs on the service device, and the application icon of the first application program and the user interface of the first application program are displayed on the terminal device;

respond to the first operation instruction through the first application program, and generate a first response result; and extract a first interface drawing instruction from the first response result, and send the first interface drawing instruction to the terminal device, wherein the first interface drawing instruction is used for the terminal device to draw a partial or complete interface corresponding to the first response result, wherein responding to the first operation instruction through the first application program, and generating the first response result includes:

invoking, based on the first operation instruction, a second application program by using the first application program, and generating the first response result, wherein the first interface drawing instruction is used for the terminal device to draw the partial interface corresponding to the first response result, and the partial interface corresponding to the first response result does not comprise a user interface of the second application program, and wherein the service device is further caused to:

send, by the service device, a first control instruction to the terminal device, wherein the first control instruction is used to instruct the terminal device to invoke a third application program, and the third application program pre-matches the second application program, wherein the third application program is a local application on the terminal device, the second application program is a local application on the service device, and the third application program pre-matches the second application program when the second application program has a same function as the third application program.

17. The service device according to claim 16, wherein the responding to the first operation instruction through the first application program, and generating the first response result comprises:
   responding to the first operation instruction through the first application program, and obtaining a first hardware instruction through analysis;
   sending the first hardware instruction to the terminal device, wherein the first hardware instruction is used to instruct the terminal device to drive a first hardware device to collect data;
   receiving a collection result that is of the first hardware device and that is sent by the terminal device; and
   generating the first response result based on the collection result of the first hardware device.

18. The service device according to claim 16, wherein the service device is further caused to:
   receive a second operation instruction sent by the terminal device, wherein the second operation instruction is generated by the terminal device based on a second input, and the second input is an input acting on a user interface of the third application program;
   respond to the second operation instruction through the second application program invoked by the first application program, and generate a second response result; and
   extract a second interface drawing instruction from the second response result, and send the second interface drawing instruction to the terminal device, wherein the second interface drawing instruction is used for the terminal device to draw a partial interface corresponding to the second response result, and the partial interface corresponding to the second response result does not comprise the user interface of the second application program.

19. The service device according to claim 16, wherein the service device is further caused to:
   receive a first message sent by a service server, wherein the first message is a receiving message of the first application program;
   respond to the first message through the first application program, and generate a third response result; and
   extract a third interface drawing instruction from the third response result, and sending the third interface drawing instruction to the terminal device, wherein the third interface drawing instruction is used for the terminal device to draw a partial or complete interface corresponding to the third response result.

20. The service device according to claim 19, wherein the service device is further caused to:
   extract a second hardware instruction from the third response result, and send the second hardware instruction to the terminal device, wherein the second hardware instruction is used to instruct the terminal device to drive, based on the second hardware instruction, a second hardware device to perform an output.

* * * * *